(12) United States Patent
Lee et al.

(10) Patent No.: US 10,430,077 B2
(45) Date of Patent: Oct. 1, 2019

(54) COVER DEVICE AND ELECTRONIC DEVICE INCLUDING COVER DEVICE

(71) Applicant: Samsung Electronics Co., Ltd., Gyeonggi-do (KR)

(72) Inventors: Wu-Seong Lee, Sejong-si (KR); Seung-Nyun Kim, Incheon (KR); So-Young Lee, Gyeonggi-do (KR); Chang-Ryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 216 days.

(21) Appl. No.: 15/492,234

(22) Filed: Apr. 20, 2017

(65) Prior Publication Data
US 2017/0308284 A1    Oct. 26, 2017

(30) Foreign Application Priority Data
Apr. 20, 2016 (KR) ........................ 10-2016-0048328

(51) Int. Cl.
*G06F 3/0488* (2013.01)
*G06F 1/16* (2006.01)
*G06F 3/14* (2006.01)

(52) U.S. Cl.
CPC ........ *G06F 3/04886* (2013.01); *G06F 1/1616* (2013.01); *G06F 1/1677* (2013.01); *G06F 3/04883* (2013.01); *G06F 3/1423* (2013.01)

(58) Field of Classification Search
CPC .. G06F 3/04883; G06F 3/1423; G06F 3/1446; G06F 3/04886; G06F 1/1616; G06F 1/1618; G06F 1/162; G06F 1/1622; G06F 1/1641; G06F 1/1649; G06F 1/1675; G06F 1/1677; G09G 2300/026; G09G 5/14; H04M 1/0216
See application file for complete search history.

(56) References Cited

U.S. PATENT DOCUMENTS

| | | | | |
|---|---|---|---|---|
| 5,990,874 A | * | 11/1999 | Tsumura | G06F 1/1626 345/100 |
| 9,817,486 B2 | * | 11/2017 | Kwak | G06F 3/0412 |
| 9,989,994 B2 | * | 6/2018 | Jeon | G06F 1/1626 |
| 2004/0056781 A1 | * | 3/2004 | Rix | G06F 3/0202 341/20 |
| 2008/0129647 A1 | * | 6/2008 | Canova | G06F 1/1622 345/1.1 |
| 2010/0056222 A1 | * | 3/2010 | Choi | H04M 1/0245 455/566 |
| 2010/0064244 A1 | * | 3/2010 | Kilpatrick, II | G06F 1/1616 715/773 |

(Continued)

FOREIGN PATENT DOCUMENTS

| | | |
|---|---|---|
| JP | 2004-302734 A | 10/2004 |
| KR | 10-2015-0009304 A | 1/2015 |
| KR | 10-1541796 B1 | 8/2015 |

*Primary Examiner* — Darlene M Ritchie
(74) *Attorney, Agent, or Firm* — Cha & Reiter, LLC.

(57) ABSTRACT

An electronic device according to various embodiments of the present disclosure may include: a first cover including one or more first sensing regions, and a processor configured to determine whether the first cover is in an open position, detect a first gesture on the one or more first sensing regions, and execute a function corresponding to the first gesture when the first cover is in the open position.

20 Claims, 21 Drawing Sheets

(56) References Cited

U.S. PATENT DOCUMENTS

| | | | | |
|---|---|---|---|---|
| 2010/0117975 A1* | 5/2010 | Cho | G06F 1/1626 | 345/173 |
| 2011/0039603 A1* | 2/2011 | Kim | G06F 1/1632 | 455/566 |
| 2011/0065474 A1* | 3/2011 | Won | H02J 7/355 | 455/556.1 |
| 2012/0194448 A1* | 8/2012 | Rothkopf | A45C 13/002 | 345/173 |
| 2013/0082902 A1* | 4/2013 | Zhou | G09G 5/00 | 345/1.3 |
| 2013/0300679 A1* | 11/2013 | Oh | A45C 11/00 | 345/173 |
| 2014/0128131 A1* | 5/2014 | Sin | H04M 1/185 | 455/575.8 |
| 2014/0184471 A1* | 7/2014 | Martynov | G06F 3/1423 | 345/1.2 |
| 2014/0198070 A1* | 7/2014 | Won | G06F 3/017 | 345/173 |
| 2014/0204511 A1* | 7/2014 | Oh | G06F 1/1632 | 361/679.01 |
| 2014/0268517 A1* | 9/2014 | Moon | H05K 7/00 | 361/679.01 |
| 2014/0274214 A1* | 9/2014 | Kim | H04M 1/0266 | 455/566 |
| 2014/0282059 A1* | 9/2014 | Oh | G06F 1/1641 | 715/744 |
| 2014/0318994 A1* | 10/2014 | Lee | A45C 11/00 | 206/37 |
| 2014/0333552 A1* | 11/2014 | Kang | G06F 3/03 | 345/173 |
| 2015/0026623 A1* | 1/2015 | Horne | G06F 3/04847 | 715/771 |
| 2015/0035771 A1* | 2/2015 | Park | G06F 3/0412 | 345/173 |
| 2015/0062097 A1* | 3/2015 | Chung | G06F 1/1626 | 345/184 |
| 2015/0105128 A1* | 4/2015 | Huang | H04B 1/3888 | 455/575.8 |
| 2015/0156312 A1* | 6/2015 | Jung | H04M 1/72575 | 455/566 |
| 2015/0222743 A1* | 8/2015 | Lee | H04M 1/72577 | 455/566 |
| 2015/0229754 A1* | 8/2015 | Won | G06F 1/165 | 455/575.8 |
| 2015/0268752 A1* | 9/2015 | Ku | G06F 1/1626 | 345/173 |
| 2015/0311940 A1* | 10/2015 | Lee | H04B 1/3888 | 455/575.8 |
| 2015/0323963 A1* | 11/2015 | Tokutake | G06F 1/1628 | 345/173 |
| 2016/0026381 A1* | 1/2016 | Kim | G06F 3/04817 | 715/761 |

* cited by examiner

COVER DEVICE AND ELECTRONIC DEVICE INCLUDING COVER DEVICE

CLAIM OF PRIORITY

This application claims the priority under 35 U.S.C. § 119(a) to Korean Application Serial No. 10-2016-0048328 which was filed in the Korean Intellectual Property Office on Apr. 20, 2016, the entire content of which is hereby incorporated by reference.

TECHNICAL FIELD

The present disclosure relates to a cover device for an electronic device and operations of the cover device in connection with the electronic device.

BACKGROUND

In recent years, portable electronic devices, such as smart phone and tablets, have been increasing in popularity. The portable electronic devices generally include displays that may scratch or break easily. Accordingly, various cover products have been introduced that protect the displays.

In the conventional electronic device including a cover, the cover simply protects the electronic device or a display of the electronic device by covering the device or the display. Thus, a user must open the cover in order to operate the electronic device. That is, because the conventional electronic device including the cover blocks the user from operating the electronic device or the display, user experience may be degraded.

SUMMARY

The present disclosure discloses an electronic device for executing an application corresponding to a gesture of a user using the gesture input through a cover device when the cover device is opened.

An electronic device according to one embodiment of the present disclosure includes: a first cover including one or more first sensing regions, and a processor configured to determine whether the first cover is in an open position, detect a first gesture on the one or more first sensing regions, and execute a function corresponding to the first gesture when the first cover is in the open position.

An electronic device according to one embodiment of the present disclosure includes: a memory for storing a plurality of applications, a first sensor for detecting an open state of a first cover, and a processor configured to receive a control signal generated based on a first gesture inputted on the first cover, and execute a function corresponding to the control signal of an application among the plurality of applications when the first sensor detects the first cover to be in an open position.

An electronic device according to one embodiment of the present disclosure includes: a first cover including one or more first sensing regions, and a processor configured to determine whether the first cover is in an open position, detect a first gesture on the one or more first sensing regions, and transmit, to a second electronic device, a control signal for executing a function corresponding to the first gesture when the first cover is in the open position.

An electronic device according to an embodiment of the present disclosure can receive a gesture input through a cover device, and can execute a function, such as executing an application, corresponding to the gesture when the cover device is opened.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
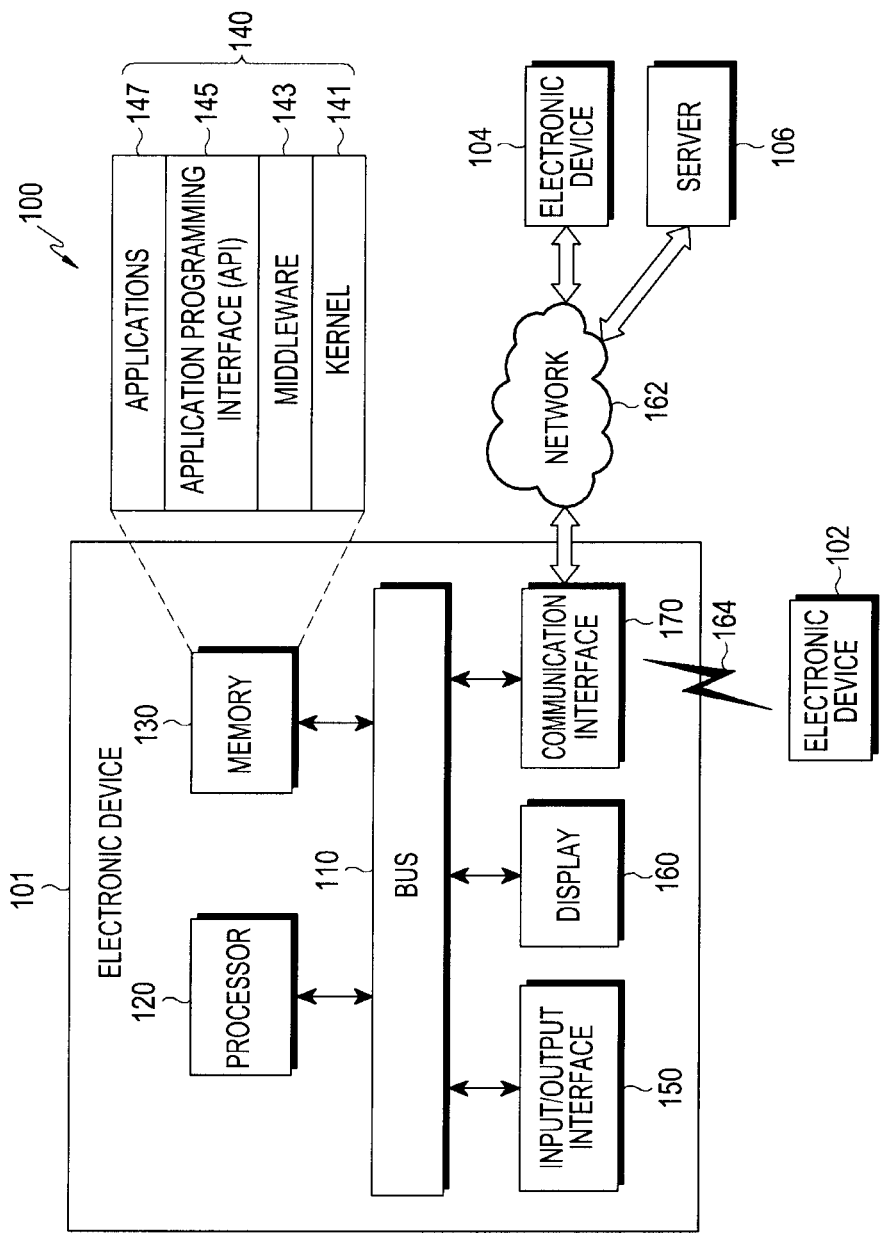
FIG. 1 is a block diagram illustrating an electronic device and a network according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B", "at least one of A and/or B", or "A/B" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements or may further include other elements. The bus 110 may include a circuit for interconnecting the components 120 to 170 and transferring communication (e.g., control messages and/or data) between the components. The processor 120 may include one or more of a Central Processing Unit (CPU), an Application Processor (AP), and a Communication Processor (CP). For example, the processor 120 may carry out operations or data processing related to the control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, a middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (for example, the bus 110, the processor 120, the memory 130, or the like) used for performing an operation or function implemented by the other programs (for example, the middleware 143, the API 145, or the application programs 147). Further, the kernel 141 may provide an interface through which the middleware 143, the API 145, or the application programs 147 may access the individual elements of the electronic device 101 to control or manage the system resources.

The middleware 143 may, for example, function as an intermediary for allowing the API 145 or the application programs 147 to communicate with the kernel 141 to exchange data. In addition, the middleware 143 may process one or more task requests received from the application programs 147 according to priorities thereof. For example, the middleware 143 may assign priorities for using the system resources (for example, the bus 110, the processor 120, the memory 130, and/or other hardware and software resources) of the electronic device 101, to at least one of the application programs 147. The API 145 is an interface used, by the applications 147, to control a function provided from the kernel 141 or the middleware 143, and may include, for example, at least one interface or function (e.g., instruction) for file control, window control, image processing, text control, etc. The input/output interface 150 may, for example, transfer instructions or data input from a user or other external devices, to other component(s) of the electronic device 101, or may output instructions or data received from the other component(s) of the electronic device 101 to the user or other external devices.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may, for example, display various types of contents (for example, text, images, videos, icons, or symbols) for the user. The display 160 may include a touch screen and receive, for example, a touch, gesture, proximity, or hovering input using an electronic pen or the user's body part using capacitive, resistive, or another type of technology. The communication interface 170 may, for example, set communication between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include a cellular communication protocol which uses at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM). According to an embodiment, the wireless communication may include at least one of, for example, Wi-Fi, Bluetooth, Bluetooth Low Energy (BLE), Zigbee, Near Field Communication (NFC), Magnetic Secure Transmission, Radio Frequency, and Body Area Network (BAN). According to an embodiment, the wireless communication includes GNSS. The GNSS may include at least one of, for example, a Global Positioning System (GPS), a Global Navigation Satellite System (Glonass), a Beidou Navigation Satellite System (hereinafter referred to as "Beidou"), and Galileo, the European Global Satellite-based Navigation System. Hereinafter, in the present document, the "GPS" and the "GNSS" may be used interchangeably with each other. The wired communication may include, for example, at least one of a Universal Serial Bus (USB), a High Definition Multimedia Interface (HDMI), Recommended Standard 232 (RS-232), Power Line Communication, and a Plain Old Telephone Service (POTS). The network 162 may include at least one of a telecommunication network, such as a computer network (e.g., a LAN or a WAN), the Internet, and a telephone network.

Each of the first and second external electronic devices 102 and 104 may be of a type that is identical to or different from that of the electronic device 101. According to one embodiment, all or some of operations performed by the electronic device 101 may be performed in another electronic device or a plurality of electronic devices (for example, external electronic devices 102 and 104 or server 106). According to an embodiment, when the electronic device 101 has to perform a function or service automatically or in response to a request, the electronic device 101 may request another device (e.g., external electronic device 102 or 104, or server 106) to perform at least some functions relating thereto, instead of autonomously or additionally performing the function or service. Another electronic device (for example, external electronic devices 102 and 104 or server 106) may execute the requested functions or the additional functions, and may deliver a result of the execution to the electronic device 101. The electronic device 101 may provide the received result as it is, or may additionally process the received result and provide the requested functions or services. To achieve this, for example, cloud computing, distributed computing, or client-server computing technology may be used.

Figure 2:
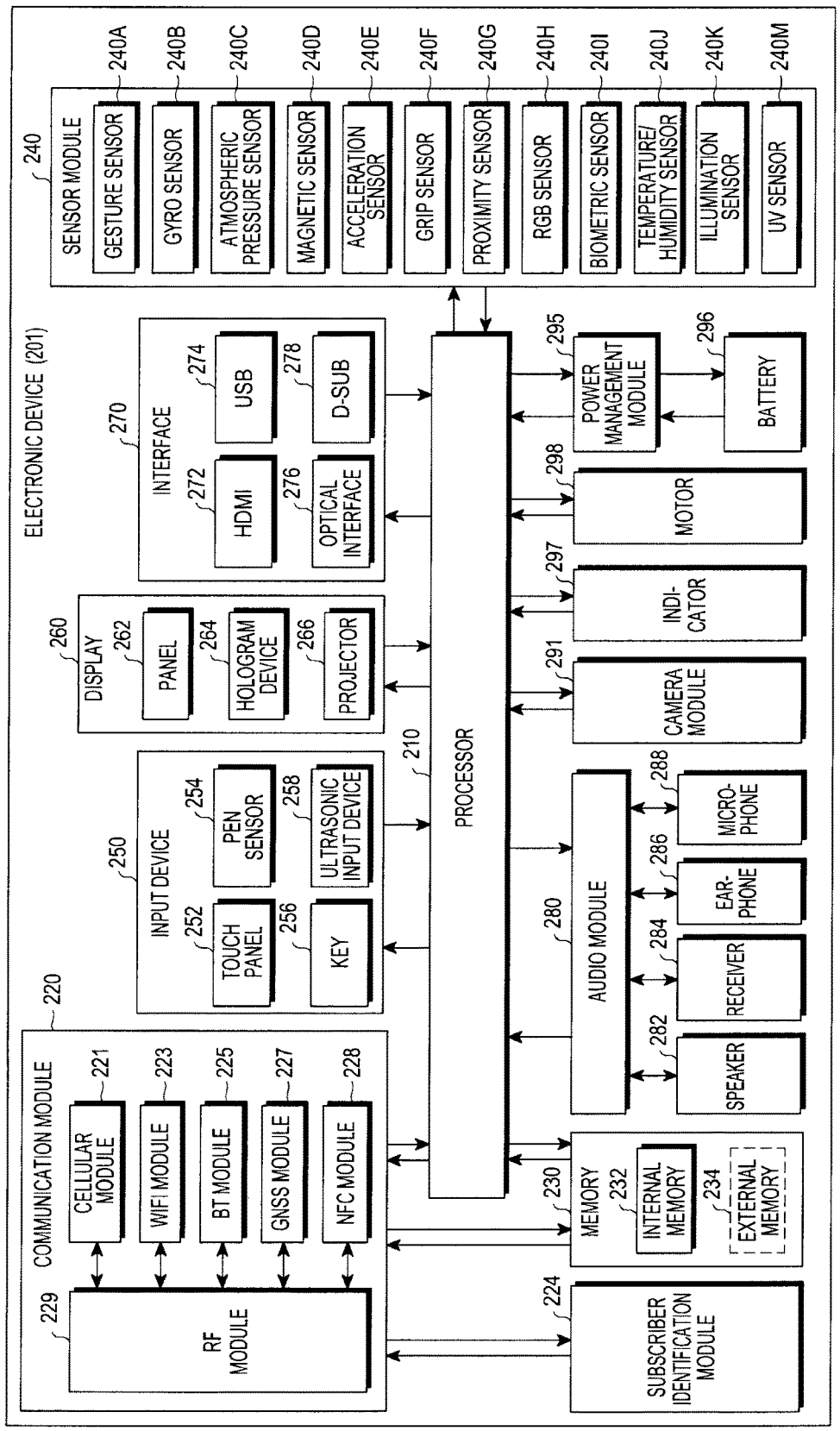
FIG. 2 is a block diagram illustrating an electronic device according to various embodiments.

FIG. 2 is a block diagram illustrating an electronic device 201 according to various embodiments. The electronic device 201 may include, for example, the whole or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298. The processor 210 may control multiple hardware or software elements connected to the processor 210 by running, for example, an Operation System (OS) or an application program, and may perform processing and operations of various types of data. The processor 210 may be implemented by, for example, a System on Chip (SoC). According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load, into a volatile memory, instructions or data received from at least one of the other elements (for example, non-volatile memory) to process the loaded instruction or data, and may store the result data in a non-volatile memory.

The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 220 may have a configuration that is identical or similar to that of the communication interface 170 illustrated in FIG. 1. The communication module 220 may include, for example, a cellular module 221, a Wi-Fi module 223, a BT module 225, a GPS module 227, an NFC module 228, and a Radio Frequency (RF) module 229. The cellular module 221 can provide a voice call, an image call, a text message service, an Internet service, or the like through, for example, a communication network. According to an embodiment, the cellular module 221 may distinguish between and authenticate electronic devices 201 within a communication network using a subscriber identification module (for example, SIM card 224). According to an embodiment, the cellular module 221 may perform at least some of the functions that the AP 210 may provide. According to an embodiment, the cellular module 221 may include a Communication Processor (CP). According to some embodiments, at least some (for example, two or more) of the cellular module 221, the Wi-Fi module 223, the Bluetooth module 225, the GNSS module 227, and the NFC module 228 may be included in a single Integrated Chip (IC) or IC package. The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal through a separate RF module. The subscriber identification module 224 may include, for example, a card including a subscriber identity module or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include at least one of, for example, a volatile memory (for example, Dynamic Random Access Memory (DRAM), Static RAM (SRAM), Synchronous Dynamic RAN (SDRAM), and the like), a non-volatile memory (for example, One Time Programmable Read-Only Memory (OTPROM), Programmable ROM (PROM), Erasable PROM (EPROM), mask ROM, flash ROM, flash memory, hard disc drive, and Solid State Drive (SSD). The external memory 234 may include a flash drive, for example, a Compact Flash (CF), a Secure Digital (SD), a Micro Secure Digital (Micro-SD), a Mini Secure Digital (Mini-SD), an eXtreme Digital (xD), a MultiMedia Card (MMC), a memory stick, or the like. The external memory 234 may be functionally and/or physically connected to the electronic device 201 through various interfaces.

The sensor module 240 may, for example, measure a physical quantity or detect an operation state of the electronic device 201, and may convert the measured or detected information into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red, Green, Blue (RGB) sensor), a biometric sensor 240I, a temperature/humidity sensor 240J, a illuminance sensor 240K, and a ultraviolet (UV) sensor 240M. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling one or more sensors included therein. In some embodiments, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input device 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user. The (digital) pen sensor 254 may include, for example, a recognition sheet which is a part of or separate from the touch panel. The key 256 may include, for example, a physical button, an optical key or a keypad. The ultrasonic input device 258 may detect ultrasonic waves generated by an input tool through a microphone (for example, the microphone 288) and identify data corresponding to the detected ultrasonic waves.

The display 260 (for example, display 160) may include a panel 262, a hologram device 264, a projector 266, and/or a control circuit for controlling the same. The panel 262 may be implemented to be, for example, flexible, transparent, or wearable. The panel 262 and the touch panel 252 may be configured as one module. According to an embodiment, the panel 262 may include a pressure sensor (or a POS sensor) which may measure the strength of the pressure of a user's touch. The pressure sensor may be implemented integrally with the touch panel 252, or may be implemented by one or more sensors separate from the touch panel 252. The hologram device 264 may show a three dimensional (3D) image in the air by using an interference of light. The projector 266 may display an image by projecting light onto a screen. The screen may be located, for example, inside or outside the electronic device 201. The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-Definition link (MHL) interface, a Secure Digital (SD) card/MultiMedia Card (MMC) interface, or an Infrared Data Association (IrDA) standard interface.

The audio module 280 may, for example, bilaterally convert sound and an electronic signal into each other. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like. The camera module 291 is, for example, a device which may photograph a still image and a video. According to an embodiment, the camera module 291 may include one or more image sensors (for example, a front sensor or a back sensor), a lens, an Image Signal Processor (ISP) or a flash (for example, LED or xenon lamp). The power management module 295 may manage, for example, power of the electronic device 201. According to an embodiment, the power management module 295 may include a Power Management Integrated Circuit (PMIC), a charging IC, or a battery or fuel gauge. The PMIC may use a wired and/or wireless charging method. Examples of the wireless charging schemes may include a magnetic resonance charging scheme, a magnetic induction charging scheme, an electromagnetic charging scheme, and the like, and may further include an additional circuit for wireless charging such as a coil loop, a resonance circuit, and a rectifier. The battery gauge may measure, for example, a residual quantity of the battery 296, and the voltage, the current, or the temperature during the charging. The battery 296 may include, for example, a rechargeable battery and/or a solar battery.

The indicator 297 may display a particular state, for example, a booting state, a message state, a charging state, or the like of the electronic device 201 or a part (for example, processor 210) of the electronic device 201. The motor 298 can convert an electrical signal into mechanical vibrations, and can generate a vibration or haptic effect. The electronic device 201 may include a mobile TV supporting device (for example, a GPU) which can, for example, process media data according to a certain standard such as Digital Multimedia Broadcasting (DMB), Digital Video Broadcasting (DVB), or mediaFlo™. Each of the above-described component elements of hardware according to the present disclosure may be configured with one or more components, and the names of the corresponding component elements may vary based on the type of electronic device. According to one embodiment, the electronic device (e.g., the electronic device 201) does not include some elements or further include additional elements. Some of elements are coupled to constitute one object but the electronic device may perform the same functions as those which the corresponding elements have before being coupled to each other.

Figure 3:
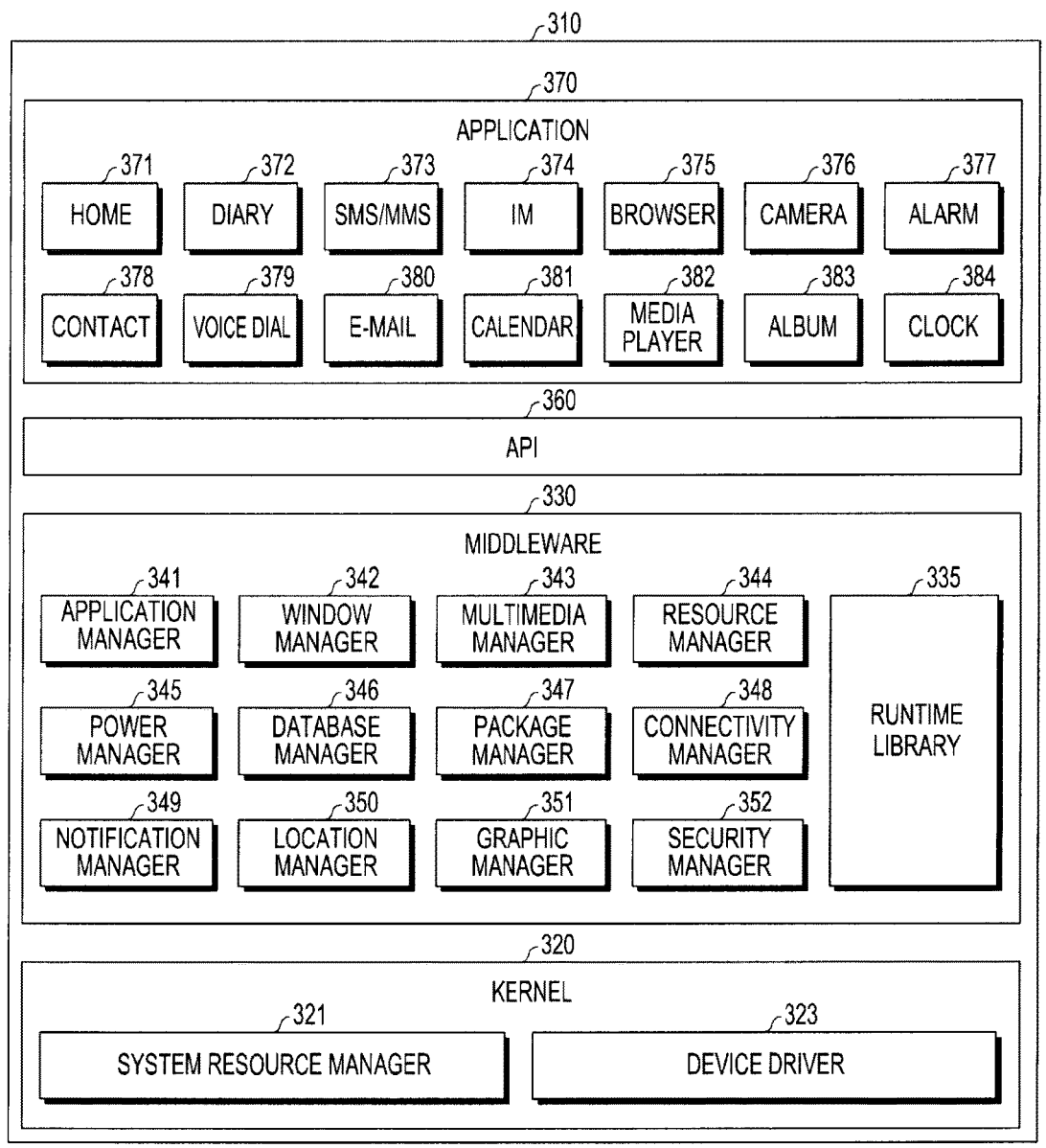
FIG. 3 is a block diagram illustrating a program module according to various embodiments.

FIG. 3 is a block diagram illustrating a program module according to various embodiments. According to an embodiment, the program module 310 (for example, the program 140) may include an Operating System (OS) for controlling resources related to the electronic device (for example, the electronic device 101) and/or various applications (for example, the application program 147) running on the OS. The OS may include, for example, Android™, iOS™, Windows™, Symbian™, Tizen™, or Bada™. Referring to FIG. 3, the program module 310 may include a kernel 320 (for example, kernel 141), a middleware 330 (for example, middleware 143), an API 360 (for example, API 145), and/or an application 370 (for example, application program 147). At least some of the program module 310 may be preloaded on the electronic device, or may be downloaded from an external electronic device (for example, the external electronic device 102 or 104, or the server 106).

The kernel 320 may include, for example, a system resource manager 321 and/or a device driver 323. The system resource manager 321 may control, assign, or collect system resources. According to an embodiment, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may, for example, provide a function required by the applications 370 in common or provide various functions to the applications 370 through the API 360 so that the applications 370 can use limited system resources within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 can perform input/output management, memory management, and processing of an arithmetic function. The application manager 341 may, for example, manage the life cycle of the applications 370. The window manager 342 may manage Graphical User Interface (GUI) resources used on a screen. The multimedia manager 343 can identify a format required to reproduce various media files, and can encode or decode a media file using a COder/DECoder (CODEC) appropriate for the corresponding format. The resource manager 344 may manage a source code of the applications 370 or the space of a memory. The power manager 345 may, for example, manage the capacity or power of the battery, and may provide power information required for operations of the electronic device. According to an embodiment, the power manager 345 may be linked to a Basic Input/Output System (BIOS). The database manager 346 can, for example, generate, search, or change a database to be used in at the applications 370. The package manager 347 may manage the installation or the updating of an application distributed in the form of a package file.

The connectivity manager 348 may, for example, manage a wireless connection. The notification manager 349 may, for example, provide an event such as an arrival message, appointment, and proximity notification, to a user. The location manager 350 can manage location information of the electronic device. The graphic manager 351 may, for example, manage a graphic effect to be provided to a user and a user interface relating to the graphic effect.—The security manager 352 may, for example, system security or user authentication. According to an embodiment, the middleware 330 may include a telephony manager for managing the voice of the electronic device or a video call function or may include a middleware module capable of forming a combination of functions of the above-described components. According to an embodiment, the middleware 330 may provide a module specialized for types of OSs. The middleware 330 may dynamically eliminate a part of existing components or add a new component. The API 360 corresponds to a set of API programming functions, and may be provided to have a different configuration according to the OS. For example, in the case of Android or iOS, one API set may be provided for each platform, and in the case of Tizen, two or more API sets may be provided for each platform.

The application 370 may include, for example, one or more applications which can provide functions such as a home function 371, a dialer 372, an SMS/MMS 373, an Instant Message (IM) 374, a browser 375, a camera 376, an alarm 377, a contact 378, a voice dialer 379, an email 380, a calendar 381, a media player 382, an album 383, a watch 384, a health care (e.g., measurement of exercise quantity or blood sugar) application, or an environment information (e.g., atmospheric pressure, humidity, or temperature information) providing application. According to an embodiment, the application 370 may include an information exchange application which can support information exchange between the electronic device and the external electronic device. The information exchange application may include, for example, a notification relay application for transmitting specific information to the external electronic device or a device management application for managing the external electronic device. For example, a notification transfer application may transfer notification information generated by another application of the electronic device to the external electronic device, or may receive notification information from the external electronic device to provide the received notification information to a user. The device management application may, for example, install, delete, or update a function (for example, turning on/off external electronic device itself (or some components thereof) or adjusting brightness of display) of an external electronic device communicating with the electronic device, or an application running on the external electronic device. According to an embodiment, the applications 370 may include an application (for example, health care application of mobile medical equipment) designated according to the property of the external electronic device. According to an embodiment, the applications 370 may include an application received from the external electronic device. At least some of the program module 310 may be implemented (for example, executed) by software, firmware, hardware (for example, processor 210), or a combination of at least two thereof, and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to one embodiment may be implemented by an instruction which is stored a computer-readable storage medium (e.g., the memory 130) in the form of a program module. When the instruction executed by a processor (e.g., the processor 120), the processor may perform a function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
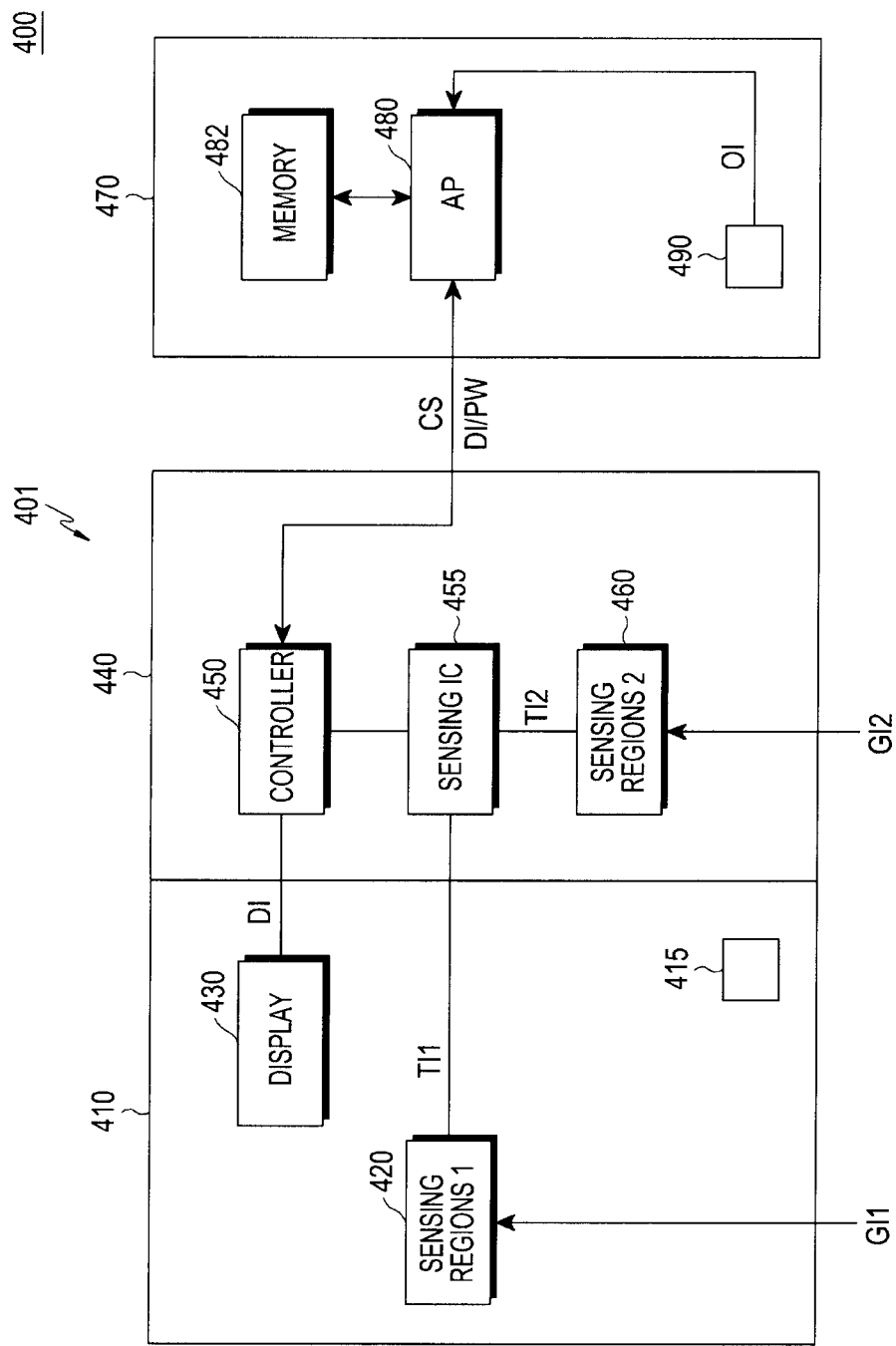
FIG. 4 is a block diagram schematically illustrating an electronic system according to one embodiment of the present disclosure.

FIG. 4 is a block diagram schematically illustrating an electronic system according to one embodiment of the present disclosure.

Referring to FIG. 4, an electronic system 400 may include a first electronic device 401 and a second electronic device 470. Further, the electronic system 400 may be implemented as one electronic device including the first electronic device 401 and the second electronic device 470.

The electronic system 400 may be a system for executing a function, such as executing an application, corresponding to a user-inputted gesture on the first electronic device 401. The executed application may be among a plurality of applications stored in the second electronic device 470.

The first electronic device 401 may receive the gesture from the user and transmit a control signal to the second electronic device based on the gesture. For example, the control signal may imply a signal or command transmitted from the first electronic device 401 to the second electronic device 470 such that the second electronic device 470 executes an application corresponding to the input gesture, where the application is among the plurality of applications stored in the second electronic device 470.

According to an embodiment, the first electronic device 401 may be implemented as a cover of the second electronic device 470. In one embodiment, the first electronic device 401 may be implemented such that the first electronic device 401 is attached to the second electronic device 470 and may be detachable.

The first electronic device 401 may include a first cover unit 410 and a second cover unit 440. For example, the first cover unit 410 may cover a part or the entirety of a first surface (for example, the front or top surface) of the second electronic device 470, and the second cover unit 440 may cover a part or the entirety of a second surface (for example, the rear or bottom surface) of the second electronic device 470. For example, the first cover unit 410 and the second cover unit 440 may be implemented to be in contact with each other.

Further, the first electronic device 401 may further include a connection unit (not illustrated) for connecting the first cover unit 410 and the second cover unit 440 to each other. In one embodiment, the first cover unit 410 and the second cover unit 440 may be connected to (or access) each other via the connection unit.

The first electronic device 401 may include a first open sensor 415, first sensing regions 420, a display 430, a controller 450, a sensing circuit (or sensing integrated circuit (IC)) 455, and second sensing regions 460.

The first sensing regions 420 may be one or more sensing regions included in the first cover unit 410. For example, the first sensing regions 420 may include a plurality of sensing regions. In various embodiments, the plurality of first sensing regions may be discrete regions or may be formed continuously.

The second sensing regions 460 may be one or more sensing regions included in the second cover unit 440. For example, the second sensing regions 460 may include a plurality of sensing regions. In various embodiments, the plurality of second sensing regions may be discrete regions or may be formed continuously.

For example, each of the first sensing regions 420 and the second sensing regions 460 may include at least one of a touch sensor, a pressure sensor, a proximity sensor, an acceleration sensor, a gyro sensor, or another type of suitable sensor.

The first sensing regions 420 may receive input of a first gesture GI1 from the user. The first sensing regions 420 may transmit first sensing information TI1 corresponding to the first gesture GI1 to a controller 450 through the sensing circuit (or sensing integrated circuit) 455.

The first gesture GI1 may be the user's gesture on the first sensing regions 420. For example, the first gesture GI1 may be a touch and a touch pattern inputted by the user on the first sensing regions 420 and/or a grip of the first cover unit 410.

The first sensing information TI1 may be information on a position, a time, the number of inputs (e.g. three touch inputs by the user's three fingers) and/or a pattern of the first gesture GI1.

Meanwhile, the first sensing regions 420 may include a plurality of sensing regions. For example, the plurality of sensing regions may receive input of a plurality of first gestures from the user. In one embodiment, the first sensing regions 420 may transmit first sensing information TI1 for positions, times, the numbers of inputs and/or patterns of the plurality of first gestures to the controller 450 through the sensing circuit (or sensing integrated circuit) 455.

The second sensing regions 460 may receive input of a second gesture GI2 from the user. The second sensing regions 460 may transmit second sensing information TI2 corresponding to the second gesture GI2 to the controller 450 through the sensing circuit (or sensing integrated circuit) 455.

The second gesture GI2 may be the user's gesture on the second sensing regions 460. For example, the second gesture GI2 may be a touch and/or a touch pattern of the user on the second sensing regions 460 and/or a grip of the second cover unit 440.

The second sensing information TI2 may be information on a position, a time, the number of inputs and/or a pattern of the second gesture GI2.

The second sensing regions 460 may also include a plurality of sensing regions. For example, the plurality of sensing regions may receive a plurality of second gestures from the user. Here, the second sensing regions 460 may transmit second sensing information TI2 related to positions, times, the number of inputs and/or patterns of the plurality of second gestures to the controller 450 through the sensing circuit (or sensing integrated circuit) 455.

The controller 450 may control an overall operation of the electronic device 401.

According to an embodiment, the controller 450 may receive the first gesture GI1 and the second gesture GI2.

The controller 450 can generate a control signal (CS) using at least one of the first gesture GI1 and the second gesture GI2.

For example, the control signal CS may be a signal for executing a function, such as executing an application, corresponding to at least one of the first gesture GI1 inputted on the first sensing regions 420 and the second gesture GI2 inputted on the second sensing regions 460. For example, the control signal CS may include information on a position, the number of inputs and/or a pattern of each of the first gesture GI1 and the second gesture GI2.

The controller 450 can transmit the control signal CS to the second electronic device 470. For example, the controller 450 may transmit the control signal CS to an application processor 480 of the second electronic device 470 in order to execute the function corresponding to at least one of the first gesture GI1 and the second gesture GI2.

According to an embodiment, the controller 450 may transmit the control signal CS to the second electronic device 470 when the first cover unit 410 is opened. In one embodiment, the controller 450 may transmit the control signal CS to the second electronic device 470 in order to execute an application corresponding to at least one of the first gesture GI1 and the second gesture GI2 when the first cover unit 410 is in an open position.

Further, the controller 450 may transmit the control signal CS to the second electronic device 470 even when the first cover unit 410 is not opened. In one embodiment, the controller 450 may transmit the control signal CS to the second electronic device 470 in order to execute an application corresponding to at least one of the first gesture GI1 and the second gesture GI2. The controller 450 may transmit the control signal CS to the second electronic device 470 in order to, for example, display an application corresponding to at least one of the first gesture GI1 and the second gesture GI2.

The controller 450 may receive display information DI from the second electronic device 470. The controller 450 may transmit the display information DI to the display 430.

The display information DI may imply information related to an application corresponding to at least one of the first gesture GI1 and the second gesture GI2. For example, the display information DI may be information of the name and/or an operation of the application corresponding to at least one of the first gesture GI1 and the second gesture GI2.

According to an embodiment, the controller 450 can transmit the display information DI to the display 430 so as to display on the display 430 the information related to the application corresponding to at least one of the first gesture GI1 and the second gesture GI2.

The controller 450 may receive a supply of power PW from the second electronic device 470. For example, the controller 450 may supply the received power PW to each of components 415, 420, 430, 455 and 460 of the first electronic device 401.

The power PW may be current received from the second electronic device 470 in order to operate the first electronic device 401.

The sensing circuit (or sensing integrated circuit) 455 may receive the first sensing information TI1 and the second sensing information TI2 from the first sensing regions 420 and the second sensing regions 460, respectively. The sensing circuit (or sensing integrated circuit) 455 may transmit the first sensing information TI1 and the second sensing information TI2 to the controller 450.

Although the sensing circuit (or sensing integrated circuit) 455 is illustrated in FIG. 4 as being separate from the controller 450 for the convenience of description, the sensing circuit (or sensing integrated circuit) 455 may be included in the controller 450. One of ordinary skill would also understand that other configurations of the sensing circuit (or sensing integrated circuit) 455 and the controller 450 are possible to perform the functionalities described herein.

The display 430 may receive the display information DI from the controller 450.

According to an embodiment, the information related to the application corresponding to at least one of the first gesture GI1 and the second gesture GI2 may be displayed on the display 430 under the control of the controller 450.

The first open sensor 415 can determine whether the first cover unit 410 is opened. For example, the first open sensor 415 can determine whether the first cover unit 410 is opened, in cooperation with a second open sensor 490.

For example, each of the first open sensor 415 and the second open sensor 490 may be implemented by a Hall effect sensor, an acceleration sensor, a magnetic sensor, a proximity sensor, an image sensor, or any other type of suitable sensor. For example, when the second open sensor 490 is implemented by a magnetic Hall effect sensor, the first open sensor 415 may be implemented by a magnetic device. In such an embodiment, the controller 450 or the application processor 480 may determine whether the first cover unit is opened according to whether the first open sensor 415 and the second open sensor 490 are in contact with each other.

The second electronic device 470 can execute a function, for example executing an application, corresponding to the control signal CS in response to the control signal CS received from the first electronic device 401.

The second electronic device 470 may include a processor 480, a memory 482, and the second open sensor 490.

The application processor 480 may control an overall operation of the second electronic device 470.

According to an embodiment, the application processor 480 can compare the gestures GI1 and/or GI2 corresponding to the control signal CS with a predetermined gesture stored in memory. The application processor 480 can execute the function corresponding to the control signal CS, such as executing an application among the plurality of applications, according to a result of the comparison.

The predetermined gesture may be a gesture corresponding to the plurality of applications configured by a user or the application processor 480. For example, the predetermined gesture may be a touch, a touch pattern, the number of input, and a touch position of the user and/or a grip of the user with respect to the first cover unit 410.

According to an embodiment, when a gesture included in the control signal CS is substantially identical or similar to the predetermined gesture, the application processor 480 can execute an application corresponding to the predetermined gesture.

The application processor 480 can transmit the display information DI to the first electronic device 401 (for example, controller 450). For example, the application processor 480 can transmit, to the first electronic device 401, the display information DI of the application corresponding to the control signal CS received from the first electronic device 401 (for example, controller 450).

The application processor 480 can supply power PW to the first electronic device 401 (for example, controller 450). For example, the application processor 480 can supply the power PW stored in a battery (not illustrated) to the first electronic device 401. Here, the battery (not illustrated) may be included in the second electronic device 470 or may be implemented as a separate battery.

The memory 482 may store a plurality of applications. Further, the memory 482 may store one or more predetermined gestures. For example, the memory 482 may be implemented by a non-volatile memory.

The second open sensor 490 can transmit an open signal OI to the application processor 480. For example, the second open sensor 490 can determine whether the first cover unit 410 is opened, in cooperation with the first open sensor 415. The second open sensor 490 can then transmit the open signal OI to the application processor 480 according to a result of the determination. In one embodiment, the open signal OI may be a signal that indicates the opening of the first cover unit 410.

Although FIG. 4 illustrates, for the convenience of description, a configuration in which some of the components 415, 420, 430, 450, 455 and 460 of the first electronic device 401 are included in the first cover unit 410 and the other components are included in the second cover unit 440, the technical spirit of the present disclosure is not limited thereto. That is, each of the components 415, 420, 430, 450, 455 and 460 of the first electronic device 401 may be implemented to be included in at least one of the first cover unit 410 and the second cover unit 440.

Figure 5:
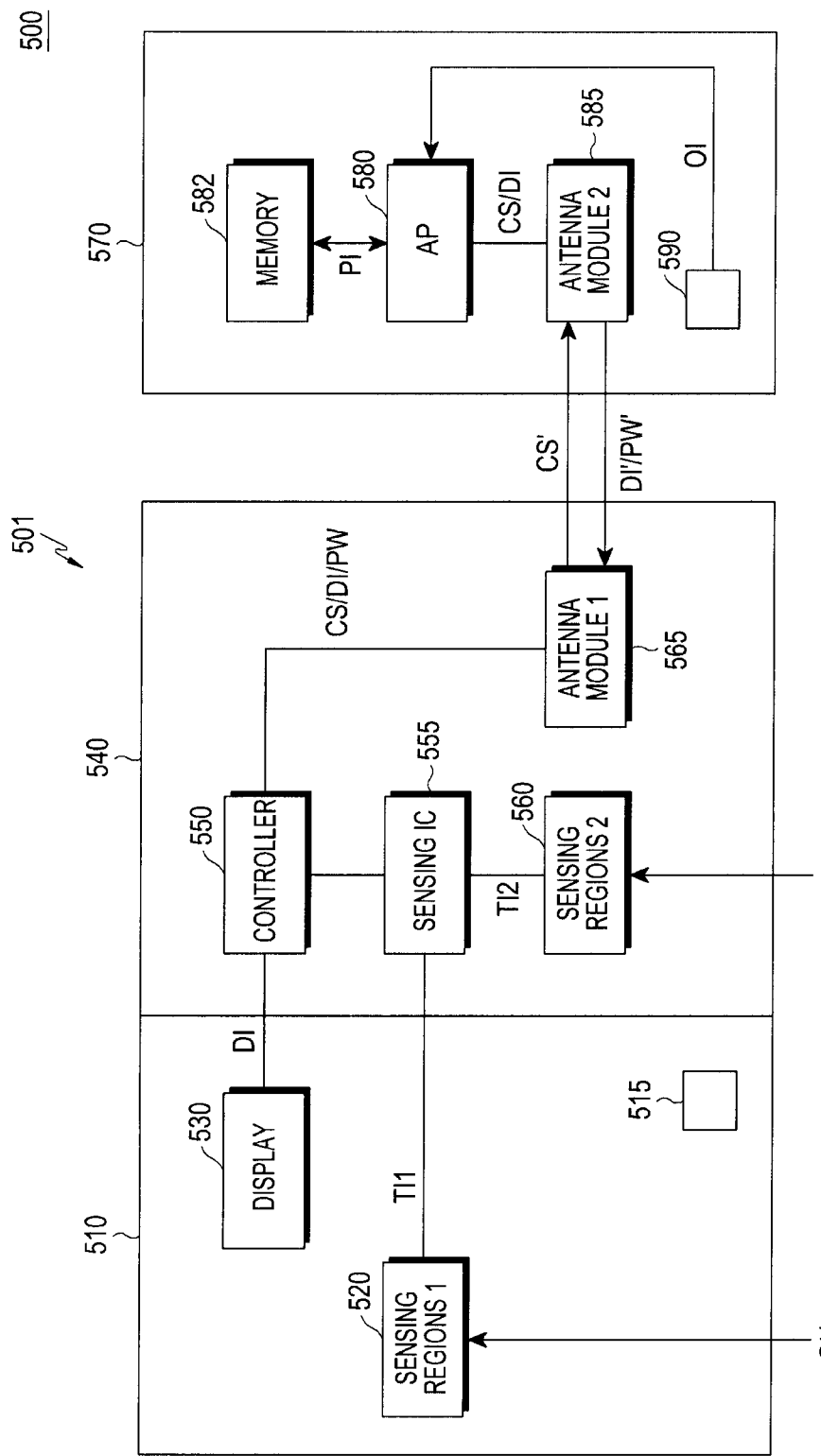
FIG. 5 is a block diagram schematically illustrating an electronic system according to one embodiment of the present disclosure.

FIG. 5 is a block diagram schematically illustrating an electronic system according to one embodiment of the present disclosure.

Referring to FIGS. 4 and 5, an electronic system 500 of FIG. 5 may be implemented to be substantially identical or similar to the electronic system 400 described in FIG. 4 except that a first electronic device 501 and a second electronic device 570 do not directly access (or are not directly connected to) each other.

The first electronic device 501 may include a first open sensor 515, first sensing regions 520, a display 530, a controller 550, a sensing circuit (or sensing integrated circuit) 555, second sensing regions 560, and a first antenna module 565, and may be implemented to be substantially identical or similar to the first electronic device 401 of FIG. 4 except for the first antenna module 565.

According to an embodiment, the first electronic device 501 can transmit a control signal CS' to the second electronic device 570 using the first antenna module 565. Further, the first electronic device 501 can receive supply of power PW' from the second electronic device 570 using the first antenna module 565. Further, the first electronic device 501 can receive display information DI' from the second electronic device 570 using the first antenna module 565.

The controller 550 may control an overall operation of the electronic device 501.

According to an embodiment, the controller 550 can receive first sensing information TI1 from the first sensing regions 520 through the sensing circuit (or sensing integrated circuit) 555, and can receive second sensing information TI2 from the second sensing regions 560 through the sensing circuit (or sensing integrated circuit) 555.

The controller 550 can generate a control signal CS using the first sensing information TI1 and the second sensing information TI2. The controller 550 can transmit the control signal CS to the first antenna module 565.

The controller 550 may receive power PW from the first antenna module 565. Further, the controller 550 may receive display information DI from the first antenna module 565.

The first antenna module 565 can receive the control signal CS from the controller 550. Further, the first antenna module 565 can transmit the control signal CS' to the second electronic device 570 (for example, using the second antenna module 585) under the control of the controller 550. In one embodiment, the control signal CS' may be implemented to be substantially identical or similar to the control signal CS except that the control signal CS' is transmitted wirelessly.

The first antenna module 565 can receive power PW' from the second electronic device 570 (for example, using second antenna module 585).

According to an embodiment, the first antenna module 565 can provide power PW to the controller 550 on the basis of the power PW' received from the second antenna module 585. The first antenna module 565 may supply power PW to the controller 550. Further, the first antenna module 565 can supply power PW to each of the components 515, 520, 530, 550, 555 and 560 of the first electronic device 501. Here, the power PW' may be implemented to be substantially identical or similar to the power PW except that the power PW' is transmitted wirelessly via, for example, a wireless charging technology.

For example, the first antenna module 565 may include a Near Field Communication (NFC) antenna and/or a Wireless Power Consortium (WPC) antenna.

The first antenna module 565 can receive display information DI' from the second electronic device 570 (for example, using second antenna module 585). Further, the first antenna module 565 can transmit the display information DI to the controller 550 under the control of the controller 550. Here, the display information DI' may be implemented to be substantially identical or similar to the display information DI except that the display information DI' is transmitted wirelessly.

The second electronic device 570 may include an application processor 580, a memory 582, a second antenna module 585, and a second open sensor 590.

The second electronic device 570 may be implemented to be substantially identical or similar to the second electronic device 570 of FIG. 4 except for the second antenna module 585.

According to an embodiment, the second electronic device 570 can receive the control signal CS' from the first electronic device 501 using the second antenna module 585. Further, the second electronic device 570 can supply power PW' to the first electronic device 501 using the second antenna module 585. Further, the second electronic device 570 can transmit the display information DI' to the first electronic device 501 using the second antenna module 585.

The application processor 580 may control an overall operation of the second electronic device 570.

According to an embodiment, the application processor 580 can receive the control signal CS from the second antenna module 585. Further, the application processor 580 can transmit the display information DI corresponding to the control signal CS to the second antenna module 585.

The second antenna module 585 can receive the control signal CS' from the first antenna module 565. Further, the second antenna module 585 can transmit the control signal CS to the application processor 580 in response to the control signal CS'.

The second antenna module 585 can supply the power PW' to the first antenna module 565 under the control of the application processor 580. Here, the second antenna module 585 can transmit the power PW' to the first antenna module 565 wirelessly, such as using a wireless charging technology.

For example, the second antenna module 585 may include a NFC antenna and/or a WPC antenna.

The second antenna module 585 can receive the display information DI from the application processor 580. Further, the second antenna module 585 can transmit the display information DI' to the first antenna module 565 in response to the display information DI.

Figure 6:
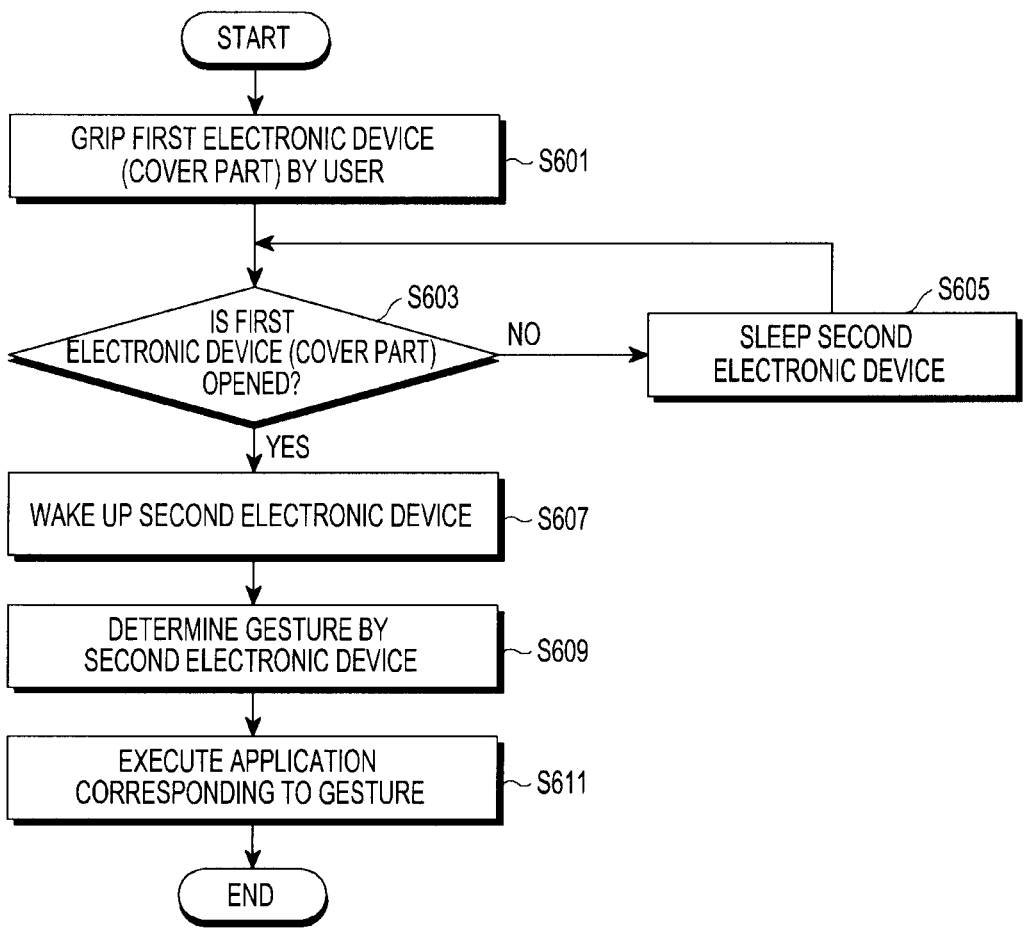
FIG. 6 is a flowchart for describing an operation method for an electronic system according to one embodiment of the present disclosure.

FIG. 6 is a flowchart for describing an operation method for an electronic system according to one embodiment of the present disclosure.

Referring to FIGS. 4 to 6, the first electronic device 401 or 501 can receive a gesture from a user. For example, the user can input a grip input to the cover units 410, 440, 510 and/or 540 of the first electronic device 401 or 501 (S601).

The second electronic device 470 or 570 can determine whether the first cover unit 410 or 510 of the first electronic device 401 or 501 is opened (S603). For example, the second electronic device 470 or 570 can determine whether the first cover unit 410 is opened using the open signal OI.

When the first cover unit 410 or 510 is not opened (NO in S603), the application processor 480 or 580 can control the second electronic device 470 or 570 to enter a sleep state (S605). Here, the sleep state may be a state in which the second electronic device 470 or 570 does not execute an application, or when the display of the second electronic device 470 or 570 is off. For example, the sleep state may be a state in which the second electronic device 470 or 570 is in a low power consumption state, in a deactivated state, or a power-off state.

When the first cover unit 410 or 510 is opened (YES in S603), the application processor 480 or 580 can control the second electronic device 470 or 570 to enter a wakeup state (S607). Here, the wakeup state may be a state in which the second electronic device 470 or 570 can execute an application. For example, the wakeup state may be a state in which the second electronic device 470 or 570 is activated or booted.

The second electronic device 470 or 570 can determine whether a gesture included in the control signal CS is substantially identical (or similar) to a predetermined gesture in response to the control signal CS received from the first electronic device 401 or 501 (S609).

When it is determined that the gesture included in the control signal CS is substantially identical (or similar) to the predetermined gesture, the second electronic device 470 or 570 can execute a function, such as execute an application, corresponding to the gesture (S611).

Meanwhile, when it is determined that the gesture included in the control signal CS is not substantially identical (or similar) to the predetermined gesture, the second electronic device 470 or 570 may not execute the function corresponding to the gesture. Here, the second electronic device 470 or 570 may provide, to a user, an alarm or notification indicating that there is no predetermined gesture matching the inputted gesture. In one embodiment, the alarm may be provided to the user using visual, auditory, tactual and/or olfactory signals.

Figure 7:
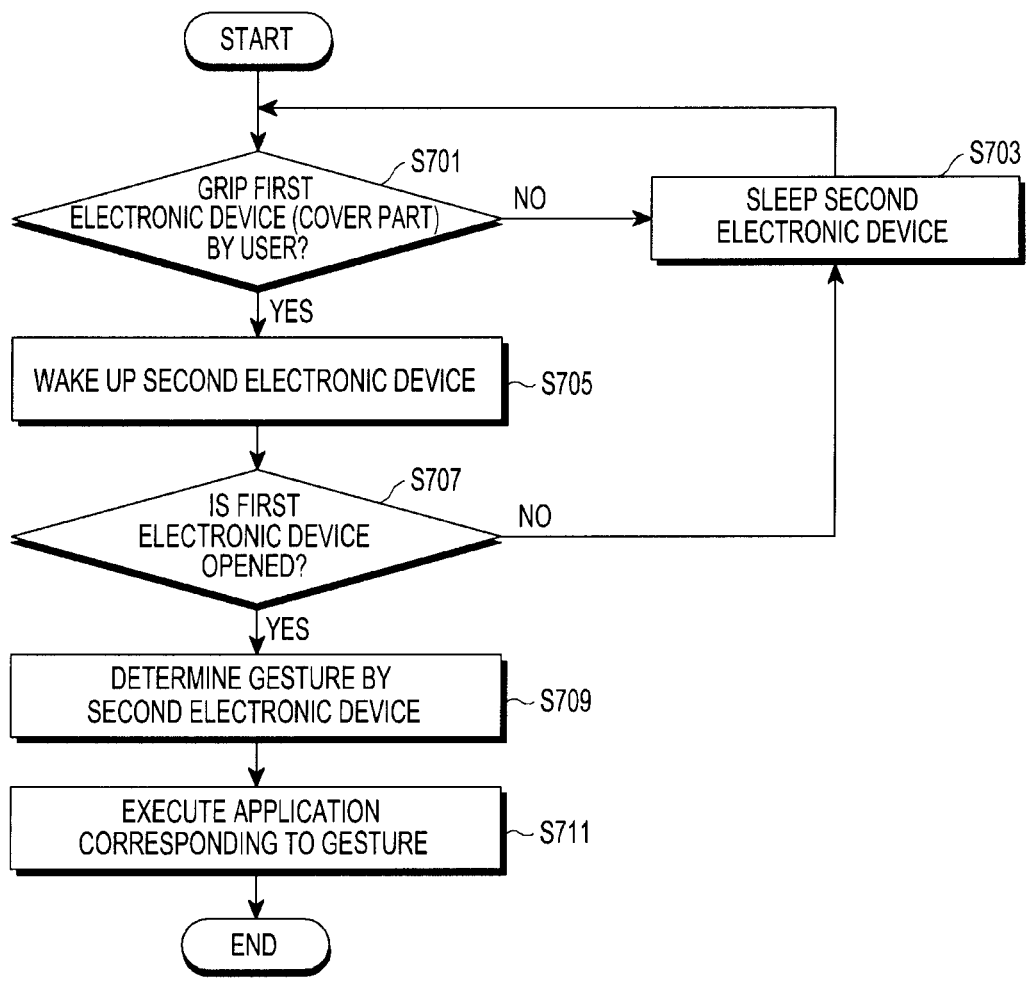
FIG. 7 is a flowchart for describing an operation method for an electronic system according to one embodiment of the present disclosure.

FIG. 7 is a flowchart for describing an operation method for an electronic system according to one embodiment of the present disclosure.

Referring to FIGS. 4 to 7, the first electronic device 401 or 501 can receive a gesture from the user. For example, the user can input a grip input to the cover units 410, 440, 510 and/or 540 of the first electronic device 401 or 501 (S701).

When the first electronic device 401 or 501 does not receive the gesture from the user (NO in S701), the application processor 480 or 580 can control the second electronic device 470 or 570 to enter a sleep state (S703). In one embodiment, the sleep state may be a state in which the second electronic device 470 or 570 does not execute an application.

When the first electronic device 401 or 501 receives the gesture from the user (YES in S701), the application processor 480 or 580 can control the second electronic device 470 or 570 to enter a wakeup state (S705). In one embodiment, the wakeup state may be a state in which the second electronic device 470 or 570 can execute an application.

The second electronic device 470 or 570 can determine whether the first cover unit 410 or 510 of the first electronic device 401 or 501 is opened (S707). For example, the second electronic device 470 or 570 can determine whether the first cover unit 410 or 510 is opened using the open signal OI.

When the first cover unit 410 or 510 is not opened (NO in S707), the application processor 480 or 580 can control the second electronic device 470 or 570 to once again enter the sleep state (S703).

When the first cover unit 410 or 510 is opened (YES in S707), the second electronic device 470 or 570 can determine whether a gesture included in the control signal CS is substantially identical (or similar) to a predetermined gesture stored in memory in response to the control signal CS received from the first electronic device 401 or 501 (S709).

When it is determined that the gesture included in the control signal CS is substantially identical (or similar) to the predetermined gesture, the second electronic device 470 or 570 can execute a function, for example executing an application, corresponding to the gesture (S711).

Meanwhile, when it is determined that the gesture included in the control signal CS is not substantially identical (or similar) to the predetermined gesture, the second electronic device 470 or 570 may not execute the application corresponding to the gesture. In one embodiment, the second electronic device 470 or 570 may provide to the user an alarm or notification indicating that there is no predetermined gesture matching the inputted gesture.

Figure 8:
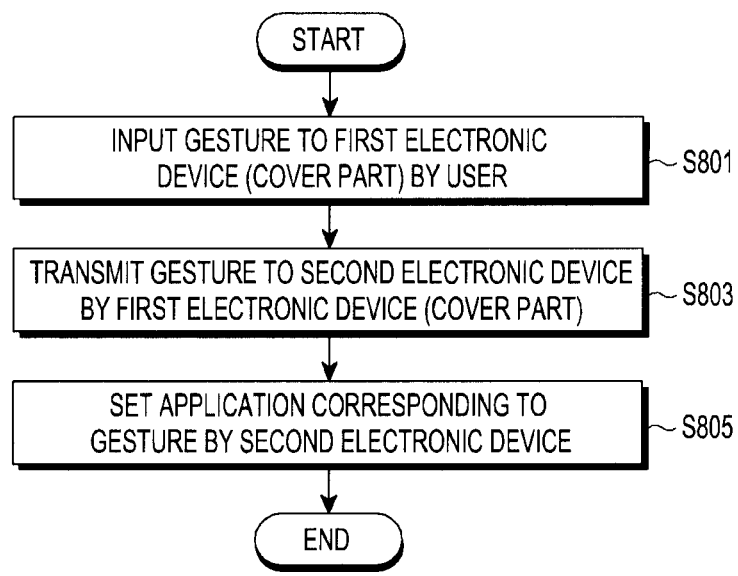
FIG. 8 is a flowchart for describing a method for configuring a gesture for an application by a second electronic device according to one embodiment of the present disclosure.

FIG. 8 is a flowchart for describing a method for configuring a gesture for an application by a second electronic device according to one embodiment of the present disclosure.

Referring to FIGS. 4 to 8, the second electronic device 470 or 570 can configure an application corresponding to a gesture input to the first electronic device 401 or 501 using the gesture.

According to an embodiment, the second electronic device 470 or 570 can configure a gesture for executing a specific application using a gesture configuring application.

The second electronic device 470 or 570 can configure an application in response to a gesture. In one embodiment, the application may be configured by a user or the application processor 480 or 580. Further, the application may be at least one of a plurality of applications stored in the second electronic device 470 or 570.

The first electronic device 401 or 501 (for example, first cover unit 410 or 510 and/or second cover unit 440 or 540) can receive input of the first gesture GI1 and/or the second gesture GI2 from a user (S801).

The first electronic device 401 or 501 can transmit information on the first gesture GI1 and/or the second gesture GI2 to the second electronic device 470 or 570 (S803).

The second electronic device 470 or 570 can configure an application corresponding to the received first gesture GI1 and/or the received second gesture GI2 (S805). For example, the second electronic device 470 or 570 can set or associate the application with the received first gesture GI1 and/or the received second gesture GI2. Further, the second electronic device 470 or 570 can configure a predetermined gesture PI using information on the received first gesture GI1 and/or the received second gesture GI2.

Figure 9A:
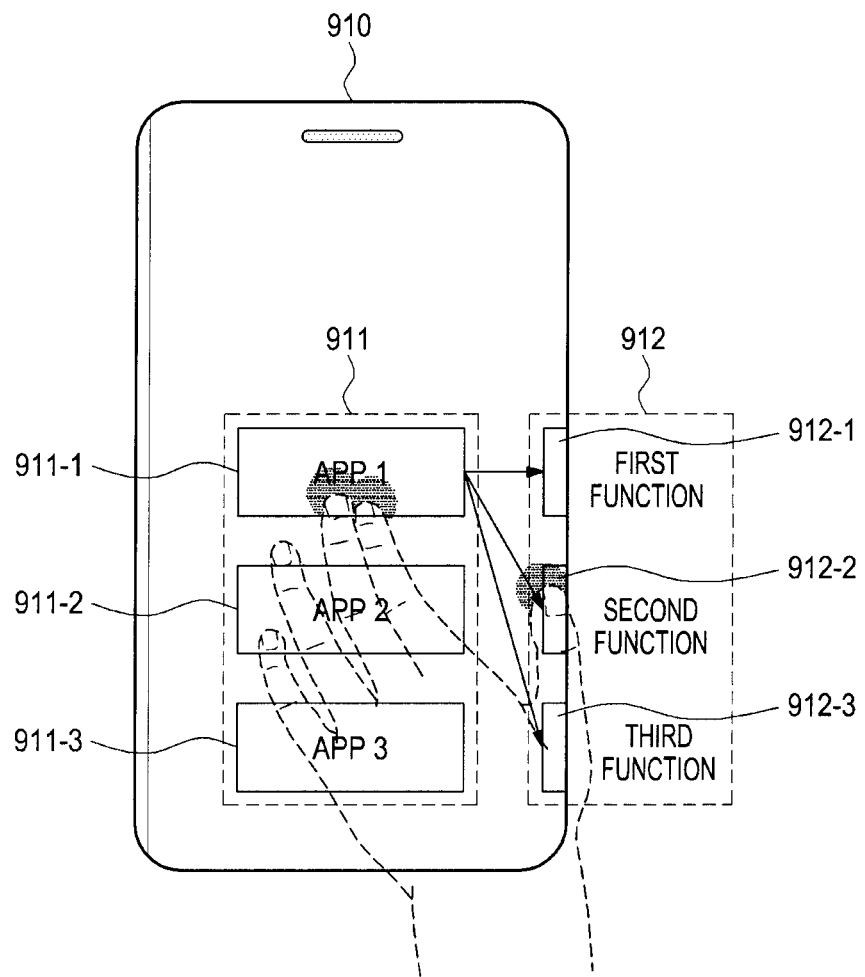
FIG. 9A and FIG. 9B are diagrams illustrating an operation of receiving a first gesture from a user by a first cover unit according to one embodiment of the present disclosure.
Figure 9B:
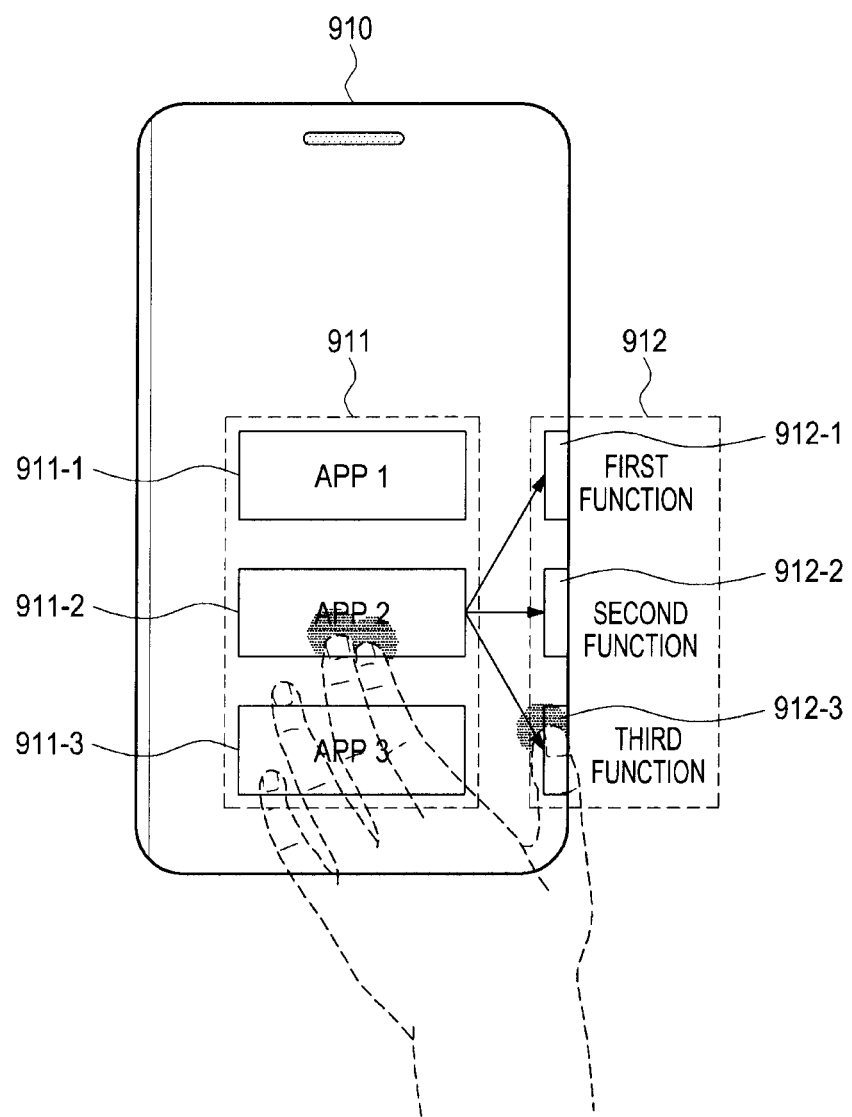

FIGS. 9A and 9B are diagrams illustrating an operation of receiving a first gesture from a user by a first cover unit according to one embodiment of the present disclosure.

Referring to FIGS. 4 to 9B, the first electronic device 401 can receive a gesture input from a user through the first cover unit 410 or 510.

The first cover unit 910 may be implemented to be substantially identical or similar to the first cover unit 410 or 510 described in FIGS. 4 and 5.

FIG. 9A is a diagram illustrating an operation of receiving a first gesture GI1 from a user by a first cover unit 910 according to an embodiment of the present disclosure.

The first electronic device 401 or 501 can transmit, to the second electronic device 470 or 570, information on a position where the first gesture GI1 is input. In one embodiment, the second electronic device 470 or 570 can execute a function, for example executing an application, corresponding to the position where the first gesture GI1 is sensed.

According to an embodiment, the first cover unit 910 may include a first sensor unit 911 and a second sensor unit 912. The first sensor unit 911 may include a plurality of regions 911-1 to 911-3, and the second sensor unit 912 may include a plurality of regions 912-1 to 912-3.

According to an embodiment, the first cover unit 910 may receive a touch for the first sensor unit 911 and a second touch for the second sensor unit 912 from the user.

For example, the user can touch the first region 911-1 of the first sensor unit 911. Further, the user can touch the second region 912-2 of the second sensor unit 912.

The first electronic device 401 or 501 can transmit the control signal CS including information on the sensed position 911-1 of the first sensor unit 911 and the sensed position 912-2 of the second sensor unit 912 to the second electronic device 470 or 570.

The second electronic device 470 or 570 can, for example, execute an application APP1 corresponding to the sensed position 911-1 of the first sensor unit 911, and can execute a second function of the application APP1 corresponding to the sensed position 912-2 of the second sensor unit 912.

FIG. 9B is a diagram illustrating an operation of receiving a first gesture GI1 from a user by a first cover unit 910 according to another embodiment of the present disclosure.

According to an embodiment, the first cover unit 910 may receive a touch for the first sensor unit 911 and a touch for the second sensor unit 912 from the user.

For example, the user can touch the second region 911-2 of the first sensor unit 911. Further, the user can touch the third region 912-3 of the second sensor unit 912.

The first electronic device 401 or 501 can transmit the control signal CS including information on the sensed position 911-2 of the first sensor unit 911 and the sensed position 912-3 of the second sensor unit 912 to the second electronic device 470 or 570.

The second electronic device 470 or 570 can, for example, execute an application APP2 corresponding to the sensed position 911-2 of the first sensor unit 911, and can execute a third function of the application APP2 corresponding to the sensed position 912-3 of the second sensor unit 912.

Therefore, the second electronic device 470 or 570 may execute a function, for example executing an application, corresponding to the sensed positions 911-1 to 911-3 of the first sensor unit 911 and the sensed positions 912-1 to 912-3 of the second sensor unit 912. For example, when a specific position of the first sensor unit 911 and a specific position of the second sensor unit 912 are sensed, the second electronic device 470 or 570 can execute an application corresponding to the specific position of the first sensor unit 911 and execute a function corresponding to the specific position of the second sensor unit 912.

For the convenience of description, only an embodiment for the first cover unit 910 is illustrated in FIGS. 9A and 9B. However, the technical spirit of the present disclosure is not limited thereto, and the above-described embodiment may be identically applied to the second cover unit 440 or 540.

Figure 10A:
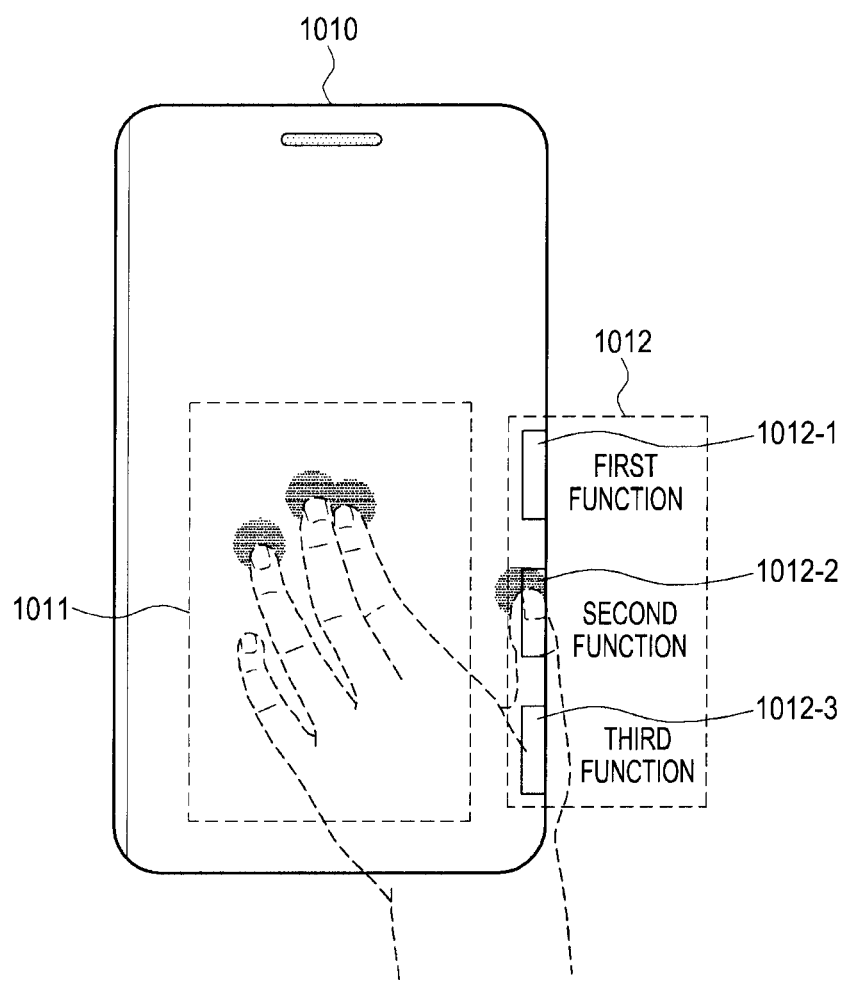
FIG. 10A and FIG. 10B are diagrams illustrating an operation of receiving a first gesture from a user by a first cover unit according to one embodiment of the present disclosure.
Figure 10B:
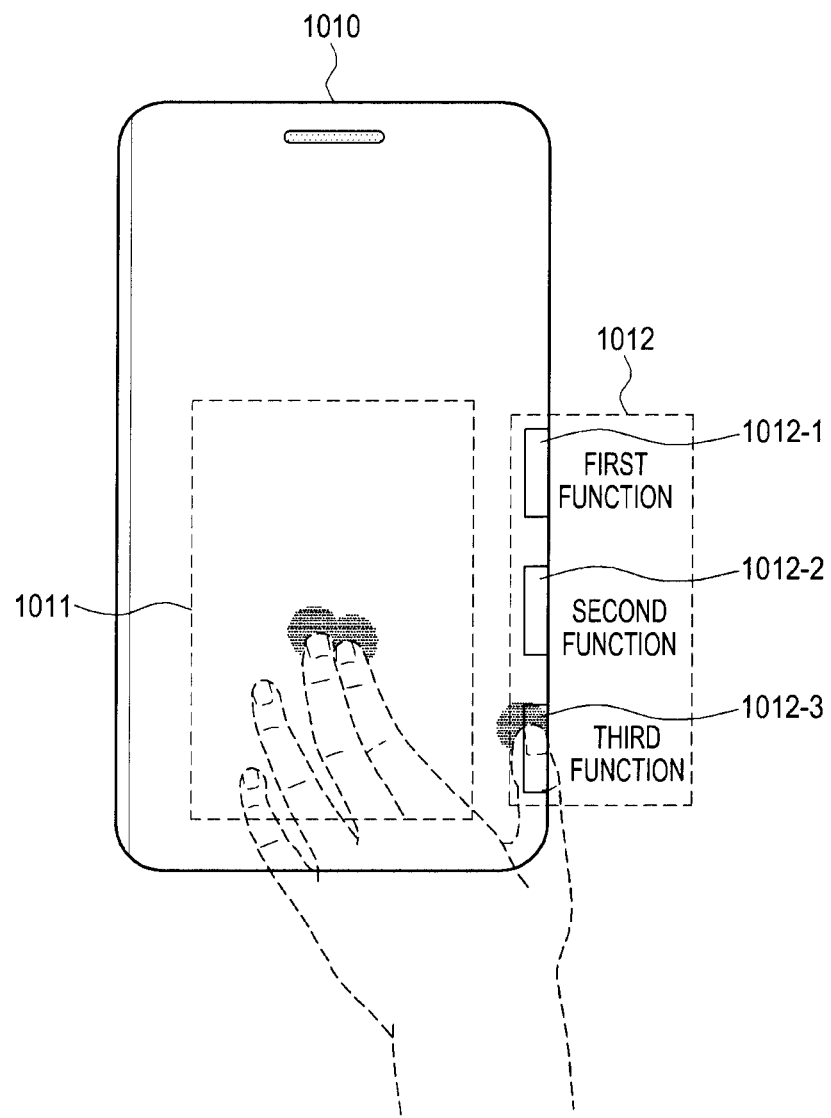

FIGS. 10A and 10B are diagrams illustrating an operation of receiving a first gesture from a user by a first cover unit according to one embodiment of the present disclosure.

Referring to FIGS. 4 to 10B, the first electronic device 401 can receive a gesture input from a user through the first cover unit 410 or 510.

The first cover unit 1010 may be implemented to be substantially identical or similar to the first cover unit 410 or 510 described in FIGS. 4 and 5.

FIG. 10A is a diagram illustrating an operation of receiving a first gesture GI1 from a user by a first cover unit 1010 according to an embodiment of the present disclosure.

The first electronic device 401 or 501 can transmit information on a position where the first gesture GI1 is input to the second electronic device 470 or 570. In one embodiment, the second electronic device 470 or 570 can execute an application corresponding to the position where the first gesture GI1 is sensed.

According to an embodiment, the first cover unit 1010 may include a first sensor unit 1011 and a second sensor unit 1012. The first sensor unit 1011 may include a sensing region, and the second sensor unit 1012 may include a plurality of regions 1012-1 to 1012-3.

According to an embodiment, the first cover unit 1010 may receive a touch for the first sensor unit 1011 and a touch for the second sensor unit 1012 from the user.

For example, the user may simultaneously or sequentially touch three portion of the sensing region of the first sensor unit 1011. Further, the user may touch the second region 1012-2 of the second sensor unit 1012.

The first electronic device 401 or 501 can transmit, to the second electronic device 470 or 570, the control signal CS including information on the number (for example, three) of sensed touches on the first sensor unit 1011 and the sensed position 1012-2 of the second sensor unit 1012.

The second electronic device 470 or 570 can, for example, execute an application corresponding to the number (for example, three) of sensed touches on the first sensor unit 1011, and execute a second function of the application corresponding to the sensed position 1012-2 of the second sensor unit 1012.

FIG. 10B is a diagram illustrating an operation of receiving a first gesture GI1 from a user by a first cover unit 1010 according to another embodiment of the present disclosure.

According to an embodiment, the first cover unit 1010 may receive a touch for the first sensor unit 1011 and a touch for the second sensor unit 1012 from the user.

For example, the user may touch the sensing region of the first sensor unit 1011. Further, the user may touch the third region 1012-3 of the second sensor unit 1012.

The first electronic device 401 or 501 can transmit, to the second electronic device 470 or 570, the control signal CS including information on the number (for example, two) of sensed touches on the first sensor unit 1011 and the sensed position 1012-3 of the second sensor unit 1012.

The second electronic device 470 or 570 can, for example, execute an application corresponding to the number (for example, two) of sensed touches on the first sensor unit 1011, and can execute a third function of the application corresponding to the sensed position 1012-3 of the second sensor unit 1012.

Therefore, the second electronic device 470 or 570 can execute an application corresponding to the sensed position of the first sensor unit 1011 and the sensed position 1012-1 to 1012-3 of the second sensor unit 1012, and/or execute a function of the application. For example, when a specific position of the first sensor unit 1011 and a specific position of the second sensor unit 1012 are sensed, the second electronic device 470 or 570 can execute an application corresponding to the specific position of the first sensor unit 1011 and a specific function of the application corresponding to the specific position of the second sensor unit 1012.

For the convenience of description, only an embodiment for the first cover unit 910 is illustrated in FIGS. 10A and 10B. However, the technical spirit of the present disclosure is not limited thereto, and the above-described embodiment may be identically applied to the second cover unit 440 or 540.

According to an embodiment, the second electronic device 470 or 570 may sense the first gesture GI1 of the first sensor unit 911 or 1011, and may change functions that correspond to sensed positions 912-1 to 912-3 or 1012-1 to 1012-3 configured in the second sensor unit 912 or 1012 according to the sensed first gesture GI1. For example, the second electronic device 470 or 570 may change the positions of the functions 912-1 to 912-3 or 1012-1 to 1012-3 configured in the second sensor unit 912 or 1012 or arrangement thereof. Further, the second electronic device 470 or 570 may exclude at least one of the functions 912-1 to 912-3 or 1012-1 to 1012-3 configured in the second sensor unit 912 or 1012 or add a function different from the configured functions 912-1 to 912-3 or 1012-1 to 1012-3.

For example, when the application corresponding to the first gesture GI1 is a game-related application, the second electronic device 470 or 570 can configure functions related to the game application, on sensing regions included in the second sensor unit 912 or 1012.

Figure 11:
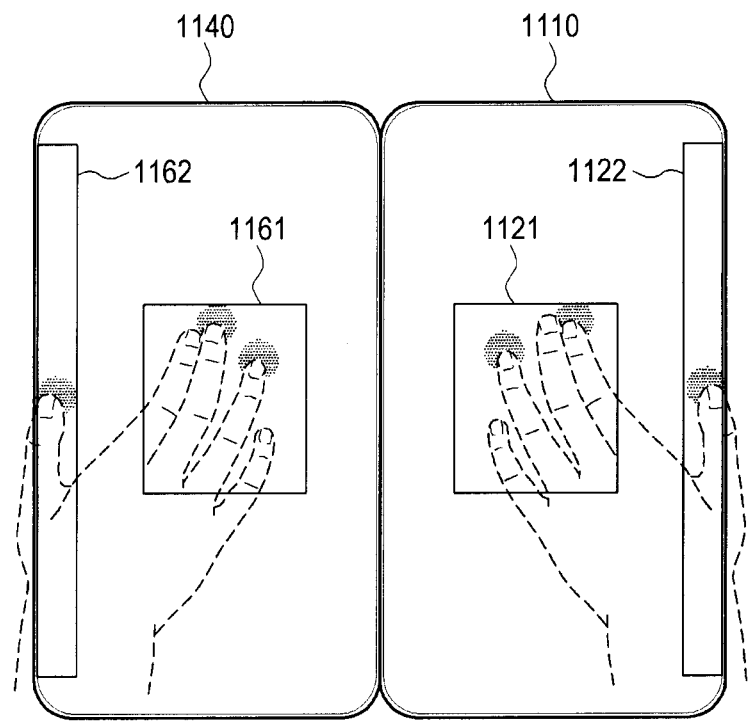
FIG. 11 is a diagram illustrating an operation of receiving a first gesture and a second gesture from a user by a first cover unit and a second cover unit according to an embodiment of the present disclosure.

FIG. 11 is a diagram illustrating an operation of receiving a first gesture GI1 and a second gesture GI2 from a user by a first cover unit 1110 and a second cover unit 1140 according to an embodiment of the present disclosure.

Referring to FIGS. 4 to 11, the first electronic device 401 may receive the first gesture GI1 through the first cover unit 410 or 510, and may receive the second gesture GI2 through the second cover unit 440 and 540.

The first cover unit 1110 may be implemented to be substantially identical or similar to the first cover unit 410 or 510 described in FIGS. 4 and 5. Further, the second cover unit 1140 may be implemented to be substantially identical or similar to the second cover unit 440 or 540 described in FIGS. 4 and 5.

According to an embodiment, the first electronic device 401 or 501 can transmit, to the second electronic device 470 or 570, information on positions where the first gesture GI1 and the second gesture GI2 are input and/or the number of inputs (e.g. the number of fingers) of the first gestures GI1 and the second gestures GI2. Here, the second electronic device 470 or 570 can, for example, execute an application corresponding to the position where the first gesture GI1 is sensed.

According to an embodiment, the first cover unit 1110 may include a first sensor unit 1121 and a second sensor unit 1122. The first sensor unit 1121 may include a sensing region, and the second sensor unit 1122 may include a sensing region. Further, the second cover unit 1140 may include a third sensor unit 1161 and a fourth sensor unit 1162. The third sensor unit 1161 may include a sensing region, and the fourth sensor unit 1162 may include a sensing region.

According to an embodiment, the first cover unit 1110 may receive touches for the first sensor unit 1121 and the second sensor unit 1122 from the user, and the second cover unit 1140 may receive touches for the third sensor unit 1161 and the fourth sensor unit 1162 from the user.

The first electronic device 401 or 501 can transmit, to the second electronic device 470 or 570, the control signal CS including information on sensing positions and/or the number of inputs of the first sensor unit 1121 and the second sensor unit 1122, and sensing positions and/or the number of inputs of the third sensor unit 1161 and the fourth sensor unit 1162.

Figure 12A:
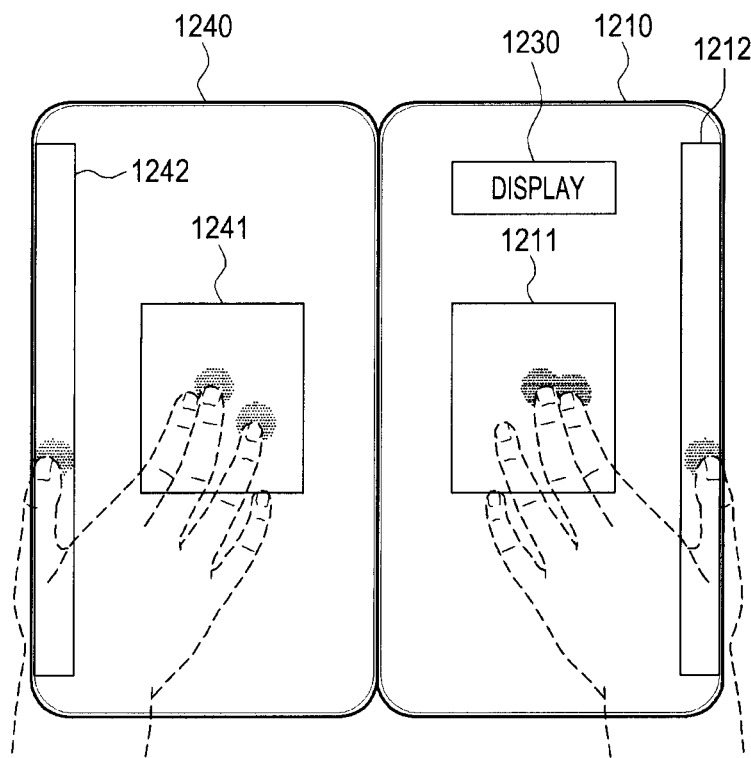
FIG. 12A and FIG. 12B are diagrams illustrating an operation method for an electronic system according to one embodiment of the present disclosure.
Figure 12B:
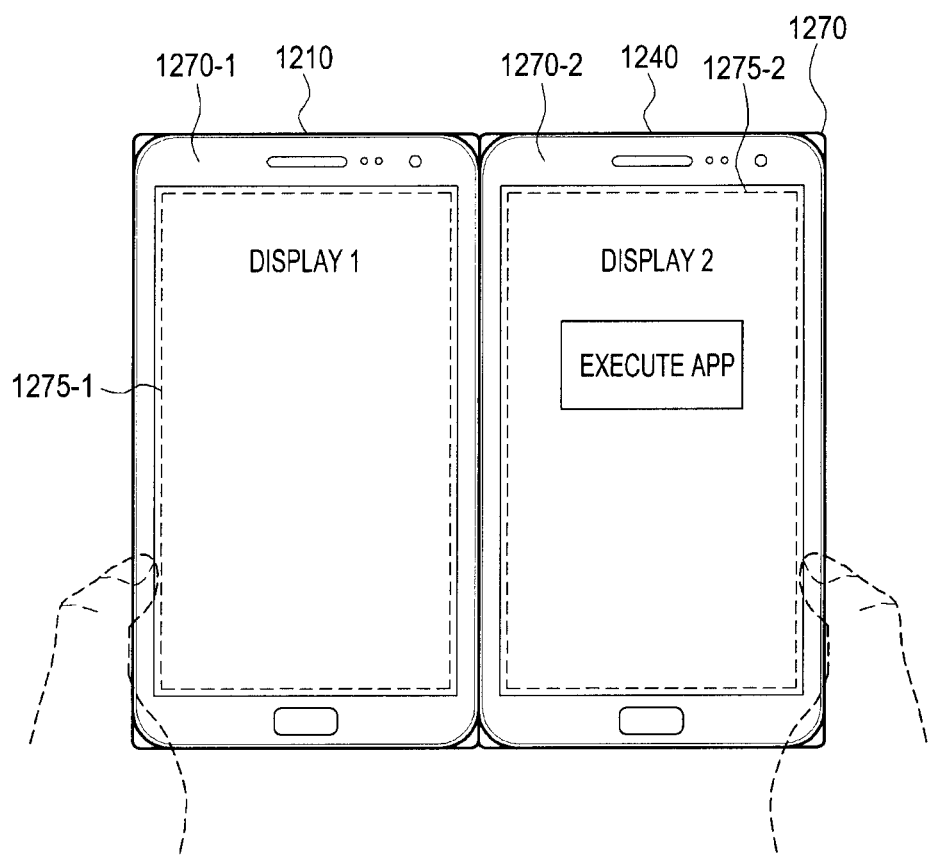

FIGS. 12A and 12B are diagrams illustrating an operation method for an electronic system according to one embodiment of the present disclosure.

Referring to FIGS. 4 to 12B, the first electronic device 401 can receive a gesture input from a user through the first cover unit 410 or 510.

The first cover unit 1210 may be implemented to be substantially identical or similar to the first cover unit 410 or 510 described in FIGS. 4 and 5. Further, the second cover unit 1240 may be implemented to be substantially identical or similar to the second cover unit 440 or 540 described in FIGS. 4 and 5.

FIG. 12A is a diagram illustrating an operation of receiving a first gesture GI1 from a user by a first cover unit 1210, and receiving a second gesture GI2 from the user by a second cover unit 1240 according to an embodiment of the present disclosure.

The operating method for the first cover unit 1210 and the second cover unit 1240 illustrated in FIG. 12A may be implemented to be substantially identical or similar to the operating method for the electronic device including the first cover unit 1210 and the second cover unit 1240 described in FIG. 11.

According to an embodiment, the first cover unit 1210 and the second cover unit 1240 illustrated in FIG. 12 may be implemented by a cover (or, cover device) of a second electronic device 1270 including dual displays 1275-1 and 1275-2, as shown in FIG. 12B. That is, the second electronic device 470 or 570 may be implemented as the second electronic device 1270 including the dual displays 1275-1 and 1275-2.

FIG. 12B is a diagram illustrating the electronic device 1270 including the dual displays 1275-1 and 1275-2 according to one embodiment of the present disclosure.

The second electronic device 1270 may include a first surface apparatus 1270-1 and a second surface apparatus 1270-2. The first surface apparatus 1270-1 may include a first display 1275-1, and the second surface apparatus 1270-2 may include a second display 1275-2.

The first cover unit 1210 may cover a portion corresponding to the first surface apparatus 1270-1, and the second cover unit 1240 may cover a portion corresponding to the second surface apparatus 1270-2.

According to an embodiment, the first cover unit 1210 may receive touches for the first sensor unit 1211 and the second sensor unit 1212 from the user, and the second cover unit 1240 may receive touches for the third sensor unit 1241 and the fourth sensor unit 1242 from the user.

The first electronic device 401 or 501 can transmit, to the second electronic device 1270, the control signal CS including information on sensed positions and/or the number of inputs of the first sensor unit 1211 and the second sensor unit 1212, and sensed positions and/or the number of inputs of the third sensor unit 1241 and the fourth sensor unit 1242.

When the first cover unit 1210 or the second cover unit 1240 is opened, the second electronic device 1270 can execute a function corresponding to the control signal CS.

Figure 13A:
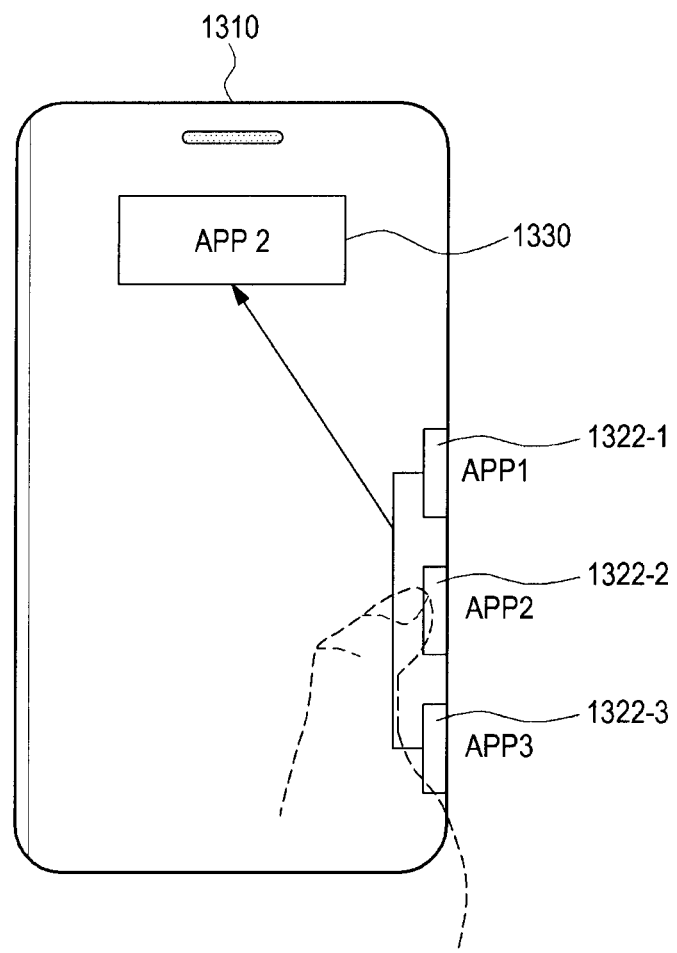
FIG. 13A, FIG. 13B and FIG. 13C are diagrams illustrating an operation method for an electronic system according to one embodiment of the present disclosure.
Figure 13B:
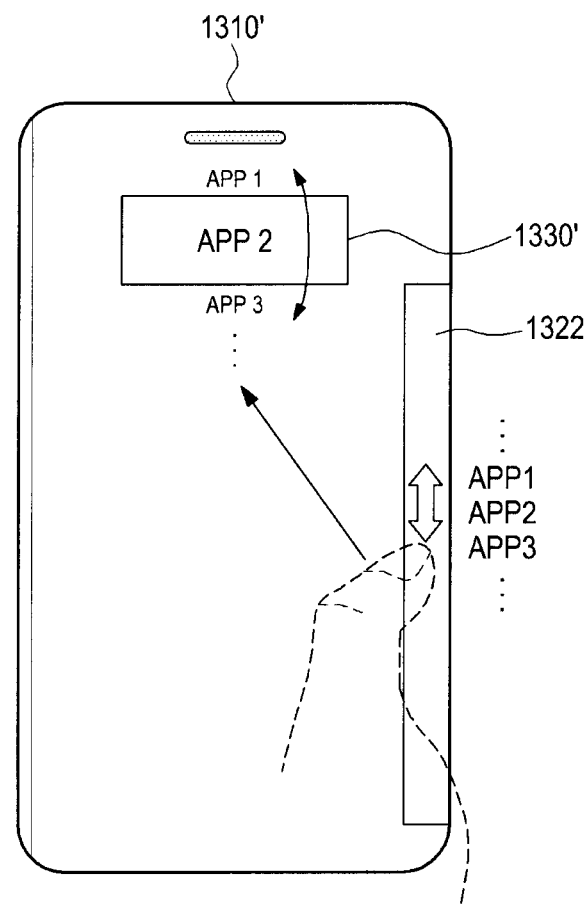
Figure 13C:
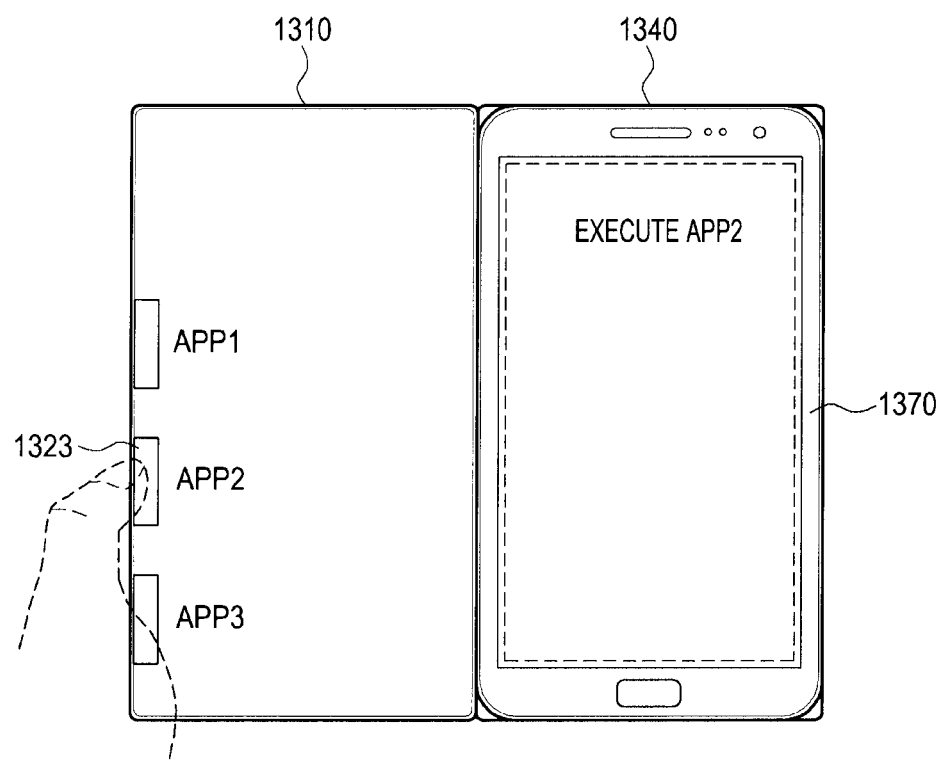

FIGS. 13A to 13C are diagrams illustrating an operating method for an electronic system according to one embodiment of the present disclosure.

Referring to FIGS. 4 to 13C, the first cover unit 1310 may be implemented to be substantially identical or similar to the first cover unit 410 or 510 described in FIGS. 4 and 5.

FIG. 13A is a diagram illustrating an operation of receiving a first gesture GI1 from a user by a first cover unit 1310 according to an embodiment of the present disclosure.

According to an embodiment, the first cover unit 1310 may include a plurality of sensing units 1322-1 to 1322-3. The plurality of sensing units 1322-1 to 1322-3 may correspond to a plurality of applications, respectively. For example, the first sensing unit 1322-1 may correspond to a first application APP1, the second sensing unit 1322-2 may correspond to a second application APP2, and the third sensing unit 1322-3 may correspond to a third application APP3.

The first cover unit 1310 may provide, to the user through a display 1330 under the control of the second electronic device 470 or 570, information on an application corresponding to a sensing unit that senses a user's gesture among the plurality of sensing units 1322-1 to 1322-3. In one embodiment, the information on the application may include the name or contents of the application.

For example, the first cover unit 1310 may display, to the display 1330, information on the second application APP2 when the second sensing unit 1322-2 detects a touch by the user.

In one embodiment, each of the plurality of sensing units 1322-1 to 1322-3 may be implemented by a discrete-type touch sensor.

FIG. 13B is a diagram illustrating an operation of receiving a first gesture GI1 from a user by a first cover unit 1310' according to another embodiment of the present disclosure.

According to an embodiment, the first cover unit 1310' may include a sensing region 1322. The sensing region 1322 may correspond to a plurality of applications. For example, the sensing region 1322 may correspond to the first application APP1, the second application APP2, and the third application APP3 by a swipe gesture of the user.

The first cover unit 1310 may provide, to the user through a display 1330' under the control of the second electronic device 470 or 570, information on an application corresponding to a region sensed by a swipe gesture inputted by the user on the sensing region 1322. In one embodiment, the information on the application may include the name or contents of the application.

For example, the first cover unit 1310 may display, on the display 1330', information on the second application APP2, when the corresponding region in the sensing region 1322 is swiped by the user.

In one embodiment, the sensing region 1322 may be implemented in a linear-type touch sensor.

FIG. 13C is a diagram illustrating an operation of executing the application corresponding to the first gesture GI1 when the first cover unit 1310 is opened according to one embodiment of the present disclosure.

The second electronic device 1370 can execute the second application APP2 corresponding to the first gesture GI1 of the user when the first cover unit 1310 is opened.

According to an embodiment, the rear surface portion of the first cover unit 1310 may include a sensing region.

For example, when the first gesture GI1 (for example, touch) of the user is sensed on a sensing region 1323 of the rear surface portion, the second electronic device 1370 may execute the second application APP2 corresponding to the first gesture GI1. In contrast, when the first gesture GI1 (for example, touch) of the user is not sensed on the sensing region 1323 of the rear surface portion, the second electronic device 1370 may not execute the second application APP2 corresponding to the first gesture GI1. The rear surface unit may be a portion of the first cover unit 1310, which is directly in contact with a display of the second electronic device 1370.

For the convenience of description, only an embodiment for the first cover unit 1310 is illustrated in FIGS. 13A to 13C. However, the technical spirit of the present disclosure is not limited thereto, and the above-described embodiment may be identically applied even to the second cover unit 1340.

Figure 14A:
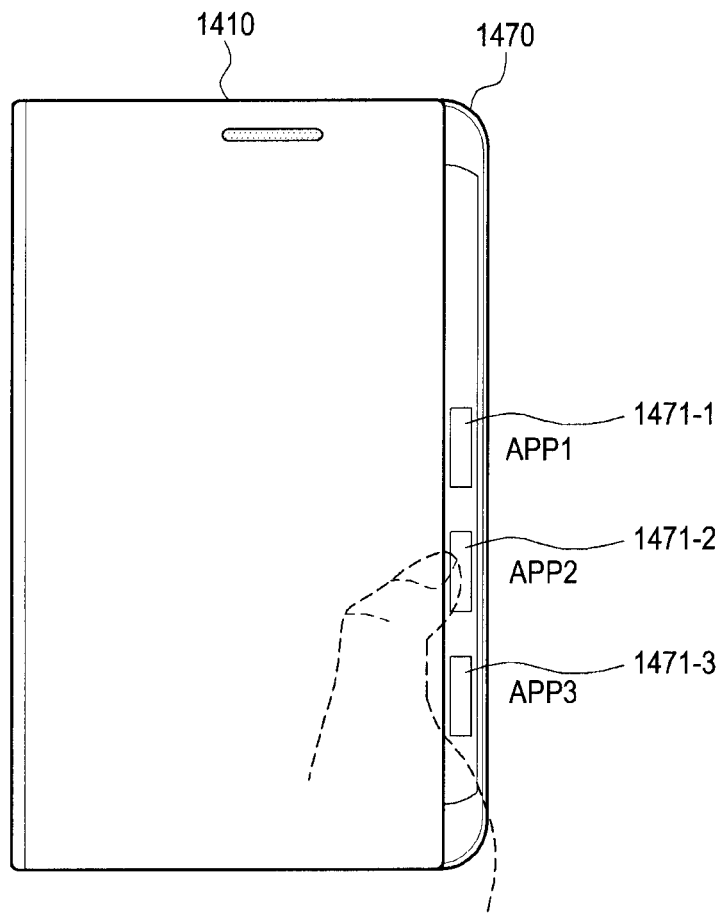
FIG. 14A and FIG. 14B are diagrams illustrating an operation method for an electronic system according to one embodiment of the present disclosure.
Figure 14B:
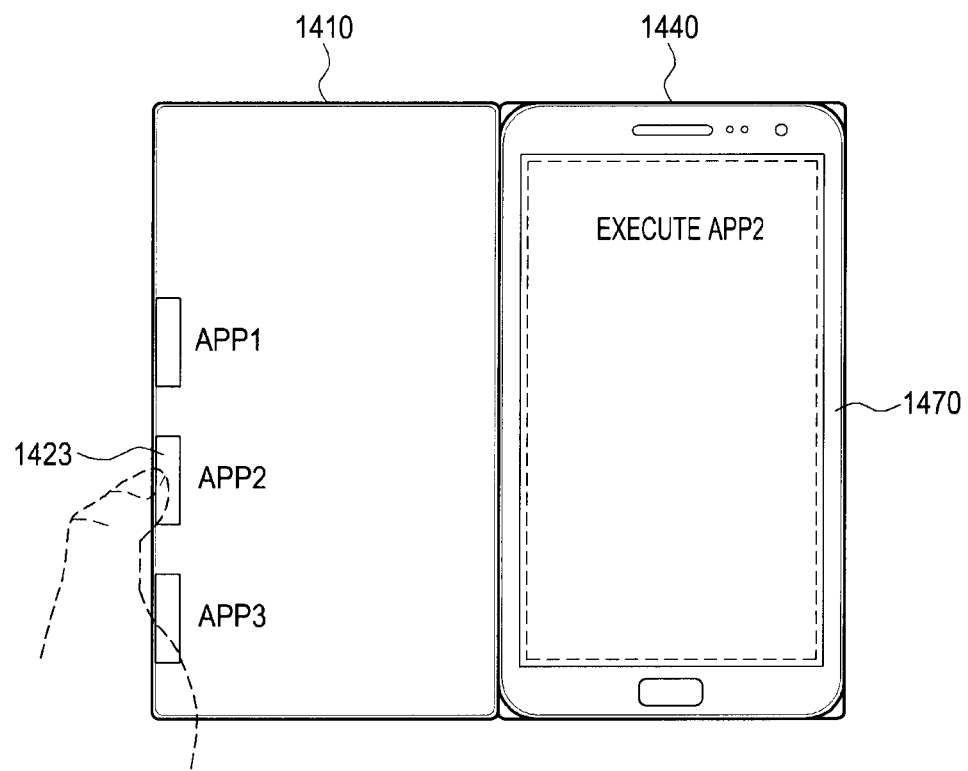

FIGS. 14A and 14B are diagrams illustrating an operation method for an electronic system according to one embodiment of the present disclosure.

The first cover unit 1410 may be implemented to be substantially identical or similar to the first cover unit 410 or 510 described in FIGS. 4 and 5. Further, the second cover unit 1440 may be implemented to be substantially identical or similar to the second cover unit 440 or 540 described in FIGS. 4 and 5.

Referring to FIGS. 4 to 14B, the second electronic device 470 or 1470 can receive a gesture from the user input from the first cover unit 1410 of the first electronic device 401 or 501. Meanwhile, the second electronic device 1470 may receive a gesture of a user through an input device of the second electronic device 1470.

FIG. 14A is a diagram illustrating an operation of receiving a gesture of the user through the input device of the second electronic device 1470.

According to an embodiment, the second electronic device 1470 may include a touch sensor, and the touch sensor may include a first sensing unit 1471-1, a second sensing unit 1471-2, and a third sensing unit 1471-3.

The first sensing unit 1471-1, the second sensing unit 1471-2, and the third sensing unit 1471-3 may correspond to a plurality of applications, respectively. For example, the first sensing unit 1471-1 may correspond to the first application APP1, the second sensing unit 1471-2 may correspond to the second application APP2, and the third sensing unit 1471-3 may correspond to the third application APP3.

The second electronic device 470 or 570 or 1470 may execute an application corresponding to a gesture (for example, touch) of the user sensed by a sensing unit. For example, when the user touches the second sensing unit 1471-2, if the first cover unit 1410 is opened, the second electronic device 470 or 570 or 1470 may execute the second application APP2.

According to an embodiment, the first cover unit 1410 may activate or deactivate the sensing units 1471-1 to 1471-3 of the second electronic device 1470 on the basis of the first gesture GI1 of the user.

For example, the first cover unit 1410 may determine a holding input from the user, which corresponds to the first gesture GI1, and may activate or deactivate the first sensing unit 1471-1, the second sensing unit 1471-2, and the third sensing unit 1471-3 according to a result of the holding input. For example, when the first gesture GI1 holds an upper end portion of the first cover unit 1410, the first cover unit 1410 may activate the first sensing unit 1471-1 and the second sensing unit 1471-2 of the second electronic device 1470, and may deactivate the third sensing unit 1471-3 of the second electronic device 1470.

FIG. 14B is a diagram illustrating an operation of executing an application corresponding to a gesture of the user when the first cover unit 1410 is opened according to one embodiment of the present disclosure.

According to an embodiment, the rear surface portion of the first cover unit 1410 may include a sensing region.

For example, when a gesture (for example, touch) of the user is sensed on a sensing region 1423 of the rear surface portion, the second electronic device 1470 may execute the second application APP2 corresponding to the gesture of the user. In contrast, when a gesture (for example, touch) of the user is not sensed on a sensing region 1423 of the rear surface portion, the second electronic device 1470 may not execute the second application APP2 corresponding to the gesture of the user.

Figure 15:
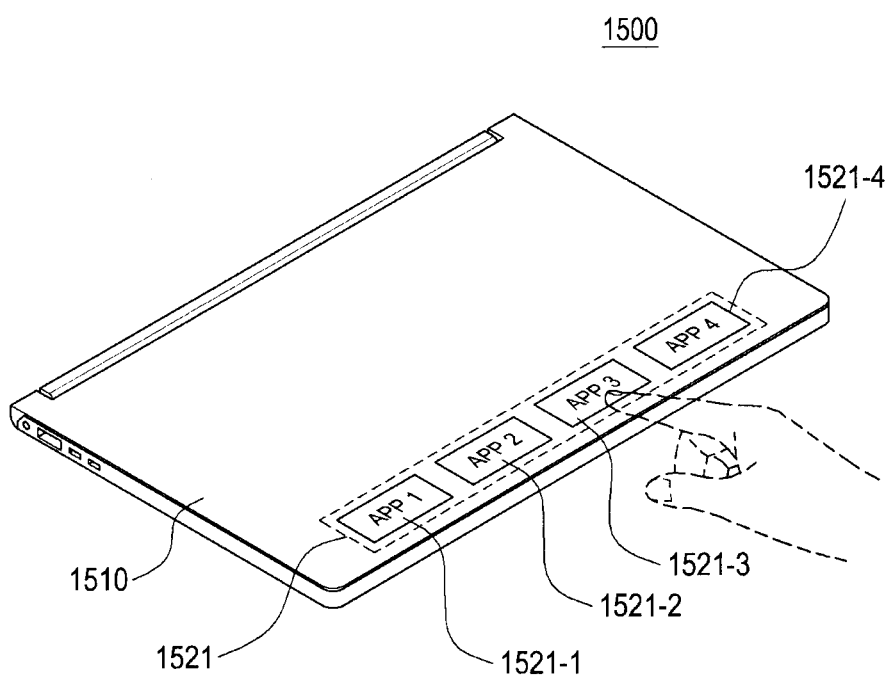
FIG. 15 is a block diagram schematically illustrating a second electronic device including a first cover unit according to one embodiment of the present disclosure.

FIG. 15 is a diagram schematically illustrating a second electronic device including a first cover unit according to one embodiment of the present disclosure.

Referring to FIGS. 4 to 15, the first cover unit 1510 may be implemented by a cover (or, cover device) of the second electronic device 1500. For example, the second electronic device 1500 may be implemented by a notebook, and the first cover unit 1510 may be implemented by a cover (or cover device) of the notebook.

Meanwhile, the first cover unit 1510 may be implemented substantially identical to the first cover unit 410 or 510 of FIGS. 4 and 5, and the second electronic device 470 or 570 of FIGS. 4 and 5 may be implemented substantially identical to the second electronic device 1500.

According to an embodiment, the first cover unit 1510 may include first sensing regions 1521. The first sensing regions 1521 may include a plurality of sensing units 1521-1 to 1521-4. The plurality of sensing units 1521-1 to 1521-4 may correspond to a plurality of applications APP1 to APP4, respectively.

For example, when the user touches the third sensing unit 1521-3, the first cover unit 1510 may transmit, to the second electronic device 1500, a control signal CS including touch information on the third sensing unit 1521-3.

When the first cover unit 1510 is opened, the second electronic device 1500 can execute a third application APP3 corresponding to the control signal CS.

An electronic device according to one embodiment of the present disclosure may include: a first cover including one or more first sensing regions, and a processor configured to determine whether the first cover is in an open position, detect a first gesture on the one or more first sensing regions, and execute a function corresponding to the first gesture when the first cover is in the open position.

The electronic device may further include a second cover including one or more second sensing regions, wherein the processor is further configured to detect a second gesture on the one or more second sensing regions, and execute a function corresponding to at least one of the first gesture and the second gesture when the first cover is in the open position.

The first cover may be a first surface cover of the electronic device covering a top surface of the electronic device, and the second cover may be a second surface cover of the electronic device covering a bottom surface of the electronic device.

The first gesture may be detected based on a position, a number of inputs, a pattern, or a pressure of the first gesture and the second gesture.

The first gesture on the first sensing regions may be detected by a first sensor and a second sensor, and the processor is further configured to execute the function corresponding to the first gesture detected by the first sensor and the second sensor.

The first cover may further include a display, and the processor is further configured to display information corresponding to the executed function on the display.

The electronic device may further include a memory, and the processor is further configured to compare a predetermined gesture stored in the memory with the first gesture, and execute the function corresponding to the first gesture according to a result of the comparison.

The electronic device may further include a memory, and the processor is further configured to associate an application among a plurality of applications stored in the memory with the first gesture.

An electronic device according to one embodiment of the present disclosure may include: a memory for storing a plurality of applications, a first sensor for detecting an open state of a first cover, and a processor configured to receive a control signal generated based on a first gesture inputted on the first cover, and execute a function corresponding to the control signal of an application among the plurality of applications when the first sensor detects the first cover to be in an open position.

The control signal may be generated based on the first gesture and a second gesture inputted on a second cover.

An electronic device according to one embodiments of the present disclosure includes: a first cover including one or more first sensing regions, and a processor configured to determine whether the first cover is in an open position, detect a first gesture on the one or more first sensing regions inputted, and transmit, to a second electronic device, a control signal for executing a function corresponding to the first gesture when the first cover is in the open position.

The first electronic device may further include a second cover including one or more second sensing regions, wherein the processor is further configured to detect a second gesture on the one or more second sensing regions, and transmit, to the second electronic device, the control signal for executing the function corresponding to least one of the first gesture and the second gesture when the first cover is in the open position The first electronic device may further include an antenna module for receiving power from the second electronic device, and the processor may transmit the control signal through the antenna module to the second electronic device.

Each of the components of the electronic device according to the present disclosure may be implemented by one or more components and the name of the corresponding component may vary depending on a type of the electronic device. In one or more embodiments, the electronic device may include at least one of the above-described elements. Some of the above-described elements may be omitted from the electronic device, or the electronic device may further include additional elements. Further, some of the components of the electronic device according to the one or more embodiments of the present disclosure may be combined to form a single entity, and thus, may equivalently execute functions of the corresponding elements prior to the combination.

The embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. An electronic device comprising:
a first cover including at least one first sensing region; and
a processor configured to:
identify a first touch gesture on the at least one first sensing region when the first cover is in a closed state;
identify whether the first cover is in an open state; and
execute a function corresponding to the first touch gesture among a plurality of functions of the electronic device in response to identifying that the first cover is in the open state,
wherein the first touch gesture is input on the at least one first sensing region when the first cover is in the closed state.

2. The electronic device of claim 1, wherein
the processor is further configured to execute the function corresponding to the first touch gesture identified using a first sensor and a second sensor separated from the first sensor,
wherein the first sensor and the second sensor are included in the at least one first sensing area.

3. The electronic device of claim 1, wherein the processor is further configured to display information corresponding to the function through a display of the first cover.

4. The electronic device of claim 1, further comprising a memory,
wherein the processor is further configured to compare a predetermined gesture stored in the memory with the first touch gesture, and execute the function corresponding to the first touch gesture according to a result of the comparison.

5. The electronic device of claim 1,
wherein the processor is further configured to execute an application corresponding to the first touch gesture among a plurality of applications stored in the electronic device.

6. The electronic device of claim 1, further comprising a second cover including at least one second sensing region,
wherein the processor is further configured to:
identify a second touch gesture on the at least one second sensing region, and
execute a function corresponding to at least one of the first touch gesture and the second touch gesture among the plurality of functions of the electronic device when the first cover is in the open state.

7. The electronic device of claim 6, wherein the first cover is a first surface cover of the electronic device covering a top surface of the electronic device, and the second cover is a second surface cover of the electronic device covering a bottom surface of the electronic device.

8. The electronic device of claim 6, wherein each of the first touch gesture and the second touch gesture are identified based on at least one of a input position, a number of inputs, a input pattern, or a pressure for each of the at least one first sensing area and the at least one second sensing area.

9. An electronic device comprising:
a first sensor; and
a processor configured to:
- identify, using the first sensor, whether a first cover which is mounted in the electronic device is in an open state,
- obtain a control signal generated based on a first touch gesture inputted on the first cover when the first cover is in a closed state, and
- execute a function corresponding to the control signal among a plurality of functions of the electronic device in response to identifying that the first cover is in the open state,
- wherein the first touch gesture is input on the at least one first sensing region when the first cover is in the closed state.

10. The electronic device of claim 9,
the processor is configured to compare a predetermined gesture stored in the electronic device and the first touch gesture and execute the function corresponding to the first touch gesture according to a result of the comparison.

11. The electronic device of claim 9, wherein the processor is further configured to execute an application corresponding to the first touch gesture among a plurality of applications stored in the electronic device.

12. The electronic device of claim 9, wherein the control signal is generated based on at least one of the first touch gesture and a second touch gesture inputted on a second cover when the first cover is in the closed state.

13. The electronic device of claim 12, wherein the first cover is a first surface cover of the electronic device covering a top surface of the electronic device, and the second cover is a second surface cover of the electronic device covering a bottom surface of the electronic device.

14. The electronic device of claim 12, wherein each of the first touch gesture and the second touch gesture is identified based on at least one of a input position, a number of inputs, a input pattern, or a pressure for each of the at least one first sensing area and the at least one second sensing area.

15. A first electronic device comprising:
a first cover including at least one first sensing region; and
a processor configured to:
- identify a first touch gesture on the at least one first sensing region when the first cover is in a closed state, and
- identify whether the first cover is in an open state,
- provide, to a second electronic device which is mounted in the first electronic device, a control signal for executing a function corresponding to the first touch gesture among a plurality of functions of the second electronic device in response to identifying that the first cover is in the open state,
- wherein the first touch gesture is input on the at least one first sensing region when the first cover is in the closed state.

16. The first electronic device of claim 15,
wherein the processor is further configured to display information corresponding to the function through a display of the first electronic device.

17. The first electronic device of claim 15, further comprising an antenna module that receives power from the second electronic device,
wherein the processor is further configured to provide the control signal to the second electronic device through the antenna module.

18. The first electronic device of claim 15, further comprising a second cover including at least one second sensing region,
wherein the processor is further configured to:
- identify a second touch gesture on the at least one second sensing regions, and
- provide, to the second electronic device, the control signal for executing the function corresponding to least one of the first touch gesture and the second touch gesture when the first cover is in the open state.

19. The first electronic device of claim 18, wherein each of the first touch gesture and the second touch gesture is identified based on at least one of a input position, a number of inputs, a input pattern, or a pressure for each of the at least one first sensing area and the at least one second sensing area.

20. The first electronic device of claim 18, wherein the first cover is a first surface cover of the second electronic device covering a top surface of the second electronic device, and the second cover is a second surface cover of the electronic device covering a bottom surface of the second electronic device.

* * * * *